United States Patent
Gallo et al.

(10) Patent No.: US 10,084,871 B2
(45) Date of Patent: Sep. 25, 2018

(54) GRAPHICAL USER INTERFACE AND VIDEO FRAMES FOR A SENSOR BASED DETECTION SYSTEM

(71) Applicants: Allied Telesis Holdings Kabushiki Kaisha, Tokyo (JP); ALLIED TELESIS, INC., Bothell, WA (US)

(72) Inventors: Joseph L. Gallo, Santa Cruz, CA (US); Ferdinand E. K. de Antoni, Manila (PH); Scott Gill, Makati (PH); Daniel Stellick, Geneva, IL (US)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 343 days.

(21) Appl. No.: 14/637,168

(22) Filed: Mar. 3, 2015

(65) Prior Publication Data
US 2015/0241993 A1    Aug. 27, 2015

Related U.S. Application Data

(63) Continuation-in-part of application No. 14/281,896, filed on May 20, 2014, now abandoned, and a (Continued)

(30) Foreign Application Priority Data

May 23, 2013    (PH) .............................. 1-2013-00136

(51) Int. Cl.
*G06F 3/03* (2006.01)
*H04L 29/00* (2006.01)
(Continued)

(52) U.S. Cl.
CPC .............. *H04L 67/22* (2013.01); *H04L 67/04* (2013.01); *H04L 67/12* (2013.01); *H04L 67/18* (2013.01)

(58) Field of Classification Search
CPC ...................... H04L 67/22; G05B 2219/40572
(Continued)

(56) References Cited

U.S. PATENT DOCUMENTS 4,970,391 A    11/1990    Uber
5,978,737 A    11/1999    Pawlowski et al.
(Continued)

FOREIGN PATENT DOCUMENTS

JP          2007085755 A    4/2007
KR    1020070028813 A    3/2007
(Continued)

OTHER PUBLICATIONS

Department of Climate Change and Energy Efficiency, National Greenhouse and Energy Reporting System Measurement: Technical Guidelines for the estimation of greenhouse gas emissions by facilities in Australia (Department of Climate Change and Energy Efficiency, Jul. 2012), 488 pages.
(Continued)

*Primary Examiner* — Moazzam Hossain
(74) *Attorney, Agent, or Firm* — Brooks Acordia IP Law, PC; Michael Zarrabian

(57) ABSTRACT

A system may include a sensor a visual capturing device, and a controller. The sensor may be configured to measure a value associated with an input. The visual capturing device may be configured to capture visual data. The controller may be configured to cause the measured value and the captured visual data to be rendered on a display device simultaneously.

22 Claims, 27 Drawing Sheets

Related U.S. Application Data continuation-in-part of application No. 14/281,901, filed on May 20, 2014, now Pat. No. 9,779,183, and a continuation-in-part of application No. 14/281,904, filed on May 20, 2014, now abandoned, and a continuation-in-part of application No. 14/284,009, filed on May 21, 2014, now Pat. No. 9,778,066, and a continuation-in-part of application No. 14/315,286, filed on Jun. 25, 2014, and a continuation-in-part of application No. 14/315,289, filed on Jun. 25, 2014, now abandoned, and a continuation-in-part of application No. 14/315,317, filed on Jun. 25, 2014, now abandoned, and a continuation-in-part of application No. 14/315,320, filed on Jun. 25, 2014, now abandoned, and a continuation-in-part of application No. 14/315,322, filed on Jun. 25, 2014, now abandoned, and a continuation-in-part of application No. 14/336,994, filed on Jul. 21, 2014, now abandoned, and a continuation-in-part of application No. 14/337,012, filed on Jul. 21, 2014, now abandoned, and a continuation-in-part of application No. 14/488,229, filed on Sep. 16, 2014, now abandoned, and a continuation-in-part of application No. 14/604,472, filed on Jan. 23, 2015, now abandoned, and a continuation-in-part of application No. 14/637,181, filed on Mar. 3, 2015.

(51) Int. Cl.
  *H04L 29/02* (2006.01)
  *H04L 29/08* (2006.01)
(58) Field of Classification Search
  USPC .......................................................... 702/189
  See application file for complete search history.

(56) References Cited

U.S. PATENT DOCUMENTS

| | | | |
|---|---|---|---|
| 6,047,244 A | 4/2000 | Rud | |
| 6,642,843 B2 | 11/2003 | Satoh | |
| 6,686,838 B1 | 2/2004 | Rezvani et al. | |
| 6,833,814 B2* | 12/2004 | Gilboa | A61B 5/06 342/448 |
| 7,030,752 B2 | 4/2006 | Tyroler | |
| 7,091,854 B1 | 8/2006 | Miao | |
| 7,555,412 B2 | 6/2009 | Nath et al. | |
| 8,575,560 B1 | 11/2013 | Fechner | |
| 8,732,592 B2 | 5/2014 | Nielsen et al. | |
| 2003/0058095 A1 | 3/2003 | Satoh | |
| 2003/0107650 A1 | 6/2003 | Colmenarez et al. | |
| 2003/0137449 A1* | 7/2003 | Vashisth | G01C 11/02 342/357.31 |
| 2004/0164859 A1 | 8/2004 | Spisa | |
| 2005/0248454 A1 | 11/2005 | Hanson et al. | |
| 2005/0286760 A1* | 12/2005 | Ohtomo | G01C 11/06 382/154 |
| 2006/0047419 A1 | 3/2006 | Diendorf et al. | |
| 2006/0086913 A1 | 4/2006 | Spahn | |
| 2006/0097171 A1 | 5/2006 | Balchunas et al. | |
| 2007/0044539 A1 | 3/2007 | Sabol et al. | |
| 2007/0143079 A1 | 6/2007 | Duxbury et al. | |
| 2007/0195712 A1 | 8/2007 | Thayer et al. | |
| 2007/0222585 A1 | 9/2007 | Sabol et al. | |
| 2007/0265866 A1 | 11/2007 | Fehling et al. | |
| 2008/0036585 A1 | 2/2008 | Gould | |
| 2008/0191871 A1 | 8/2008 | Horak et al. | |
| 2008/0249791 A1 | 10/2008 | Iyer | |
| 2008/0271143 A1 | 10/2008 | Stephens et al. | |
| 2009/0006589 A1 | 1/2009 | Forbes et al. | |
| 2009/0033487 A1 | 2/2009 | McFadden et al. | |
| 2009/0063122 A1 | 3/2009 | Nasle | |
| 2009/0119142 A1 | 5/2009 | Yenni et al. | |
| 2009/0153438 A1 | 6/2009 | Miller et al. | |
| 2009/0201896 A1 | 8/2009 | Davis et al. | |
| 2009/0225161 A1* | 9/2009 | Otani | G01C 11/12 348/135 |
| 2009/0236538 A1 | 9/2009 | Frank | |
| 2010/0274592 A1 | 10/2010 | Nitzan et al. | |
| 2010/0315242 A1 | 12/2010 | Bullard et al. | |
| 2011/0074596 A1 | 3/2011 | Frohlick et al. | |
| 2011/0096319 A1* | 4/2011 | Otani | G01C 3/00 356/3.14 |
| 2011/0148905 A1 | 6/2011 | Simmons et al. | |
| 2011/0153655 A1 | 6/2011 | Kim et al. | |
| 2011/0161885 A1 | 6/2011 | Gonia et al. | |
| 2011/0193704 A1 | 8/2011 | Harper et al. | |
| 2012/0001754 A1* | 1/2012 | Kraus | G08B 25/004 340/540 |
| 2012/0002733 A1 | 1/2012 | Misra et al. | |
| 2012/0042326 A1 | 2/2012 | Jain et al. | |
| 2012/0140063 A1* | 6/2012 | Shimada | G01C 15/00 348/135 |
| 2012/0150783 A1 | 6/2012 | Jung et al. | |
| 2012/0197911 A1 | 8/2012 | Banka et al. | |
| 2012/0212574 A1 | 8/2012 | Blumenfeld | |
| 2012/0229283 A1* | 9/2012 | McKenna | G08B 17/06 340/584 |
| 2012/0280798 A1 | 11/2012 | Li et al. | |
| 2012/0313779 A1 | 12/2012 | Papaefstathiou et al. | |
| 2012/0323623 A1 | 12/2012 | Sabharwal | |
| 2013/0009780 A1 | 1/2013 | Marshall et al. | |
| 2013/0124597 A1 | 5/2013 | Diao et al. | |
| 2013/0176467 A1* | 7/2013 | Lin | H04N 5/232 348/294 |
| 2013/0184031 A1 | 7/2013 | Pollington et al. | |
| 2013/0262349 A1 | 10/2013 | Bouqata et al. | |
| 2013/0304385 A1 | 11/2013 | William | |
| 2013/0338465 A1 | 12/2013 | Taub et al. | |
| 2014/0028457 A1 | 1/2014 | Reinpoldt et al. | |
| 2014/0046504 A1 | 2/2014 | Shachor et al. | |
| 2014/0074982 A1 | 3/2014 | Misra et al. | |
| 2014/0118123 A1 | 5/2014 | Lim et al. | |
| 2014/0197959 A1* | 7/2014 | Tarmey | G08B 13/19682 340/691.6 |
| 2014/0245808 A1 | 9/2014 | Pradhan et al. | |
| 2014/0266793 A1 | 9/2014 | Velado et al. | |
| 2014/0278646 A1 | 9/2014 | Adrian et al. | |
| 2014/0280319 A1 | 9/2014 | Rishe | |
| 2014/0287782 A1 | 9/2014 | Davis et al. | |
| 2014/0347186 A1 | 11/2014 | Harper et al. | |
| 2014/0347483 A1* | 11/2014 | Nakanishi | B60R 11/04 348/148 |
| 2014/0372565 A1 | 12/2014 | Klemets et al. | |
| 2015/0101269 A1 | 4/2015 | Moreno et al. | |
| 2015/0178657 A1 | 6/2015 | Kleehammer et al. | |
| 2015/0189005 A1 | 7/2015 | Dubois et al. | |
| 2015/0192682 A1 | 7/2015 | Valentino et al. | |
| 2015/0213631 A1 | 7/2015 | Broek | |
| 2015/0213703 A1 | 7/2015 | Filson et al. | |
| 2015/0248275 A1 | 9/2015 | Gallo et al. | |
| 2015/0339594 A1 | 11/2015 | Gallo et al. | |

FOREIGN PATENT DOCUMENTS

| | | |
|---|---|---|
| KR | 100900937 B1 | 6/2009 |
| KR | 1020110053145 A | 5/2011 |
| KR | 1020130038549 A | 4/2013 |
| KR | 1020130115445 A | 10/2013 |

OTHER PUBLICATIONS

Gunther Schadow et al., The Unified Code for Units of Measure, (2009) http://web.archive.org/web/20130116071912/http://unitsofmeasure.org/ucum.html, version 1.8.2, copyright 1998-2009, Regenstrief Institute, Inc. and the UCUM Organization, 61 pages.
International Search Report for serial No. PCT/US2015/031632 dated Aug. 27, 2015.

(56) References Cited

OTHER PUBLICATIONS

International Search Report for serial No. PCT/US2015/031644 dated Aug. 27, 2015.
International Search Report for serial No. PCT/US2015/031825 dated Aug. 11, 2015.
International Search Report for serial No. PCT/US2015/031835 dated Aug. 26, 2015.
Aberer, Karl, Hauswirth, Manfred, Salehi, Ali, "Infrastructure for data processing in large-scale interconnected sensor networks", 2007, IEEE pp. 198-205.

* cited by examiner

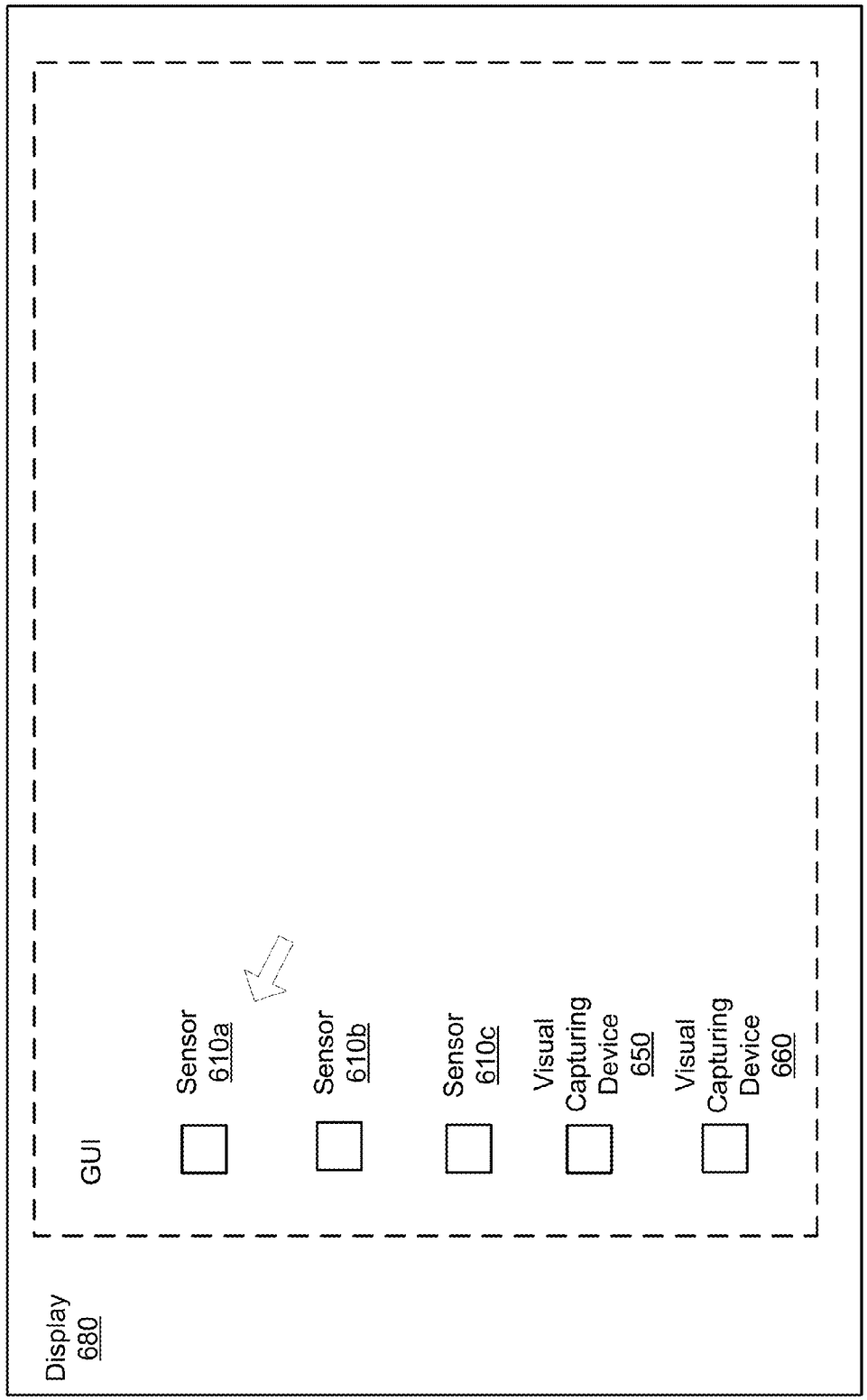

Display 680

GUI

☒ User Selection of Sensor and Visual Capturing Device Grouping

☐ Automatic Sensor and Visual Capturing Device Grouping

| | Location | Name | MAC | Description | Latitude | Longitude | IP Addr |
|---|---|---|---|---|---|---|---|
| ☒ Sensor 610a | LAX Term 1 | Gate 1 | | | 33.9412 | -118.401 | |
| ☐ Sensor 610b | LAX Term 2 | Gate 7 | | | 33.9812 | -318.401 | |
| ☐ Sensor 610c | LAX Term 2 | Gate 9 | | | 33.9812 | -118.402 | |
| ☒ Visual Capturing Device 650 | LAX Term 1 | Gate 1 | | | 33.9413 | -118.401 | |
| ☐ Visual Capturing Device 660 | LAX Term 2 | Gate 8 | | | 33.9813 | -118.401 | |

FIGURE 9A

GRAPHICAL USER INTERFACE AND VIDEO FRAMES FOR A SENSOR BASED DETECTION SYSTEM

RELATED U.S. APPLICATIONS

This application is a continuation in part of the U.S. patent application Ser. No. 14/281,896 entitled "SENSOR BASED DETECTION SYSTEM", by Joseph L. Gallo et al., filed on 20 May 2014, which is incorporated by reference herein.

This application is a continuation in part of the U.S. patent application Ser. No. 14/281,901 entitled "SENSOR MANAGEMENT AND SENSOR ANALYTICS SYSTEM", by Joseph L. Gallo et al., filed on 20 May 2014, which is incorporated by reference herein.

This application is a continuation in part of the U.S. patent application Ser. No. 14/315,286 entitled "METHOD AND SYSTEM FOR REPRESENTING SENSOR ASSOCIATED DATA", by Joseph L. Gallo et al., filed on 25 Jun. 2014, which is incorporated by reference herein.

This application is a continuation in part of the U.S. patent application Ser. No. 14/315,289 entitled "METHOD AND SYSTEM FOR SENSOR BASED MESSAGING", by Joseph L. Gallo et al., filed on 25 Jun. 2014, which is incorporated by reference herein.

This application is a continuation in part of the U.S. patent application Ser. No. 14/604,472 entitled "ALERT SYSTEM FOR SENSOR BASED DETECTION SYSTEM", by Joseph L. Gallo et al., filed on 23 Jan. 2015, which is incorporated by reference herein.

This application is a continuation in part of the U.S. patent application Ser. No. 14/315,317 entitled "PATH DETERMINATION OF A SENSOR BASED DETECTION SYSTEM", by Joseph L. Gallo et al., filed on 25 Jun. 2014, which is incorporated by reference herein.

This application is a continuation in part of the U.S. patent application Ser. No. 14/315,320 entitled "GRAPHICAL USER INTERFACE OF A SENSOR BASED DETECTION SYSTEM", by Joseph L. Gallo et al., filed on 25 Jun. 2014, which is incorporated by reference herein.

This application is a continuation in part of the U.S. patent application Ser. No. 14/315,322 entitled "GRAPHICAL USER INTERFACE FOR PATH DETERMINATION OF A SENSOR BASED DETECTION SYSTEM", by Joseph L. Gallo et al., filed on 25 Jun. 2014, which is incorporated by reference herein.

This application is a continuation in part of the U.S. patent application Ser. No. 14/281,904 entitled "EVENT MANAGEMENT FOR A SENSOR BASED DETECTION SYSTEM", by Joseph L. Gallo et al., filed on 20 May 2014, which is incorporated by reference herein.

This application is a continuation in part of the U.S. patent application Ser. No. 14/336,994 entitled "SENSOR GROUPING FOR A SENSOR BASED DETECTION SYSTEM", by Joseph L. Gallo et al., filed on 21 Jul. 2014, which is incorporated by reference herein.

This application is a continuation in part of the U.S. patent application Ser. No. 14/337,012 entitled "DATA STRUCTURE FOR A SENSOR BASED DETECTION SYSTEM", by Joseph L. Gallo et al., filed on 21 Jul. 2014, which is incorporated by reference herein.

This application is a continuation in part of the U.S. patent application Ser. No. 14/488,229 entitled "SENSOR ASSOCIATED DATA PROCESSING CUSTOMIZATION", by Joseph L. Gallo et al., filed on 16 Sep. 2014, which is incorporated by reference herein.

This application is a continuation in part of the U.S. patent application Ser. No. 14/637,181 entitled "PLAYBACK DEVICE FOR A SENSOR BASED DETECTION SYSTEM", by Joseph L. Gallo et al., filed on 3 Mar. 2015, which is incorporated by reference herein.

This application is a continuation in part of the U.S. patent application Ser. No. 14/284,009, entitled "USER QUERY AND GAUGE-READING RELATIONSHIPS", by Ferdinand E. K. de Antoni, filed May 21, 2014, which is incorporated herein by reference.

This application is related to Philippines Patent Application No. 1/2013/000136, "A DOMAIN AGNOSTIC METHOD AND SYSTEM FOR THE CAPTURE, STORAGE, AND ANALYSIS OF SENSOR READINGS", by Ferdinand E. K. de Antoni, filed May 23, 2013, which is incorporated by reference herein.

BACKGROUND

As technology has advanced, computing technology has proliferated to an increasing number of areas while decreasing in price. Consequently, devices such as smartphones, laptops, GPS, etc., have become prevalent in our community, thereby increasing the amount of data being gathered in an ever increasing number of locations. Unfortunately, most of the gathered information is used for marketing and advertising to the end user, e.g., smartphone user receives a coupon to a nearby coffee shop, etc., while the security of our community is left exposed and at a risk of terrorist attacks such as the Boston Marathon bombers. Furthermore, surveillance devices, if any, are usually a tool to bring assailants to justice and are punitive in nature rather than being used as a preventative tool.

SUMMARY

Accordingly, a need has arisen to use a sensor based detection system to detect occurrence of a possible event, e.g., possible terrorist activity, possible radiation or biohazardous material, etc., and further to complement the sensor based detection system with surveillance footage. There is also a need to facilitate a playback functionality associated with the sensor(s) readings such that events in the past and event in real-time can be analyzed. As a result, the sensor based detection system equipped with a surveillance system results in a preventative system rather as well as a punitive one.

According to some embodiments, a system may include one or more sensors, and a controller. The sensor, e.g., thermal sensor, electromagnetic sensor, Geiger counter, mechanical sensor, motion sensor, biological/chemical sensor, etc., may be configured to measure a value, e.g., radiation value, thermal value, electromagnetic value, etc., associated with an input, according to some embodiments. In some embodiments, the controller may be configured to cause the measured values or values derived from the measured values to be rendered on a display device. It is appreciated that the displayed measured values may be a subset of all the measured values for each sensor.

According to some embodiments, the measured values may include historical values, real-time values, or any combination thereof. The controller may be configured to display a playback control graphical user interface (GUI), enabling a user to scroll through time and the measured values.

According to some embodiments, the controller is further configured to display information associated with the sensors, e.g., geo-locational position, sensor type, etc. The controller may be configured to display a representation of the sensors and the sensor readings on a map, where the sensors are displayed with respect to their geo-locational positions of one another. The controller may also be configured to display a path traveled by a bio-hazardous material from the measured values.

According to some embodiments, a system may include a sensor, a visual capturing device, and a controller. The sensor, e.g., thermal sensor, electromagnetic sensor, mechanical sensor, motion sensor, biological/chemical sensor, etc., may be configured to measure a value, e.g., radiation value, thermal value, electromagnetic value, etc., associated with an input, according to some embodiments. The visual capturing device, e.g., video camera, digital camera, etc., may be configured to capture visual data, e.g., video frames, pictures, etc. In some embodiments, the controller may be configured to cause the measured value and the captured visual data to be rendered on a display device simultaneously.

According to some embodiments, the controller may be further configured to cause the measured value to be time stamped and stored in a storage medium for later retrieval. In some embodiments, the controller may be further configured to determine whether the measured value satisfies a certain condition, e.g., whether the measured value exceeds a certain threshold, whether the measured value falls outside of the acceptable range, whether the measured value is within a certain range, etc.

In some embodiments, the controller in response to determining that the measured value satisfies the certain condition may cause the captured visual data to be time stamped and stored in a storage medium for later retrieval. However, it is appreciated that in some embodiments, the captured visual data may be time stamped automatically regardless of whether the measured value satisfies the certain condition.

It is appreciated that in some embodiments the sensor and the visual capturing device are within a same physical proximity, the captured visual data is associated with the measured value, and the controller is configured to cause the measured value and the captured visual data to be rendered on the display device simultaneously. According to some embodiments, the sensor is configured to measure a plurality of values associated with the input, the visual capturing device is configured to capture a sequence of visual data associated with the plurality of values, and the controller is configured to cause the plurality of values and the sequence of visual data to be rendered on the display device simultaneously and scroll through in time responsive to user manipulation.

According to one embodiment, and various other features and advantages will be apparent from a reading of the following detailed description.

BRIEF DESCRIPTION OF DRAWINGS

The embodiments are illustrated by way of examples, and not by way of limitation, in the figures of the accompanying drawings and in which like reference numerals refer to similar elements.

FIGS. 8A-8C show rendering of another sensor readings and visual capturing device in a sensor based system in accordance with some embodiments.

FIGS. 9A-9D show selection and display of sensors and their associated visual capturing devices in a sensor based system in accordance with some embodiments.

DETAILED DESCRIPTION

Figure 1:
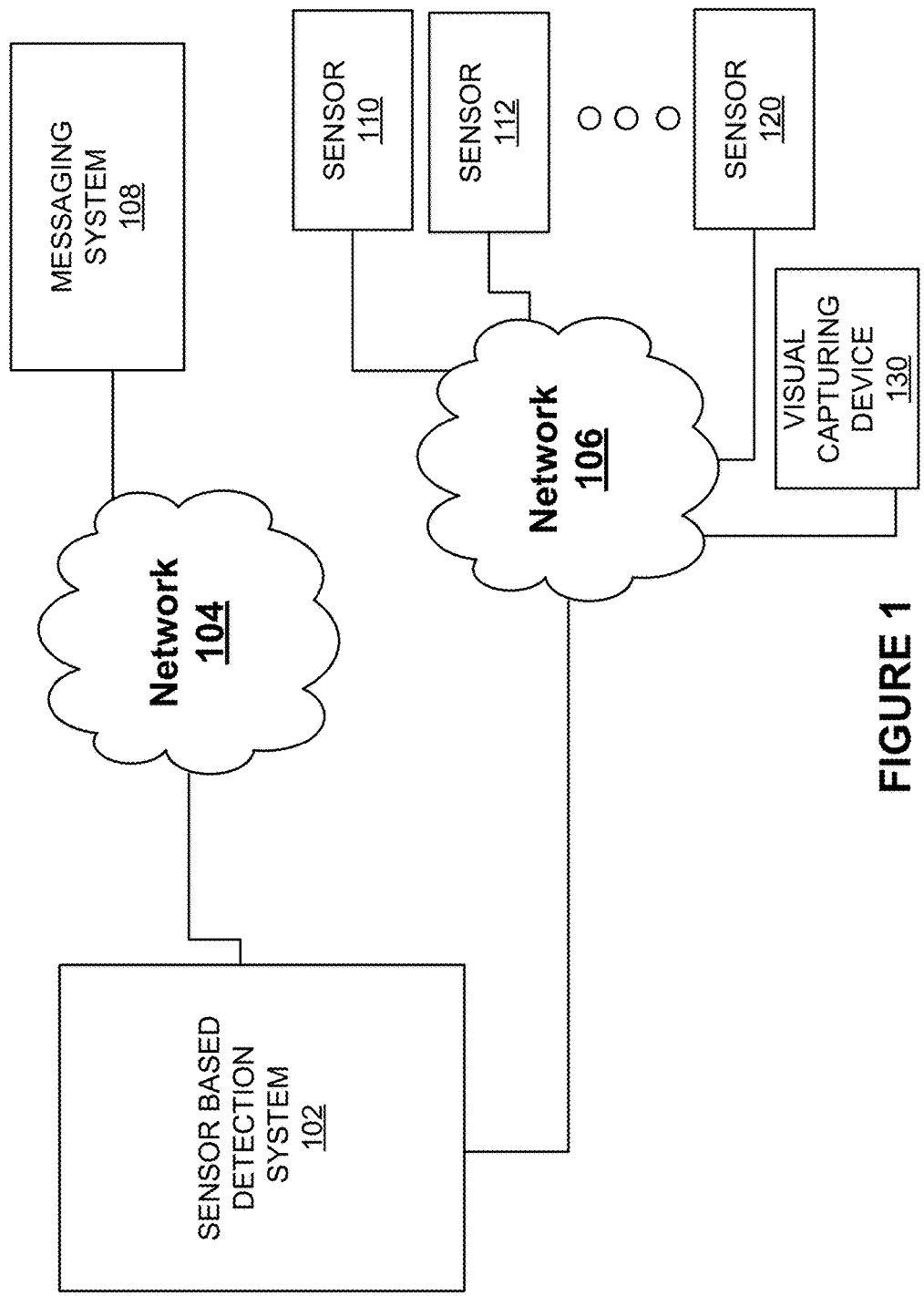
FIG. 1 shows an operating environment in accordance with some embodiments.

Reference will now be made in detail to various embodiments, examples of which are illustrated in the accompanying drawings. While the claimed embodiments will be described in conjunction with various embodiments, it will be understood that these various embodiments are not intended to limit the scope. On the contrary, the claimed embodiments are intended to cover alternatives, modifications, and equivalents, which may be included within the scope of the appended Claims. Furthermore, in the following detailed description, numerous specific details are set forth in order to provide a thorough understanding of the claimed embodiments. However, it will be evident to one of ordinary skill in the art that the claimed embodiments may be practiced without these specific details. In other instances, well known methods, procedures, components, and circuits are not described in detail so that aspects of the claimed embodiments are not obscured.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "converting," "transmitting," "storing," "determining," "sending," "querying," "providing," "accessing," "associating," "configuring," "initiating," "customizing", "mapping," "modifying," "analyzing," "displaying," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data, that are non-transitory. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

A need has arisen for a solution to allow monitoring and collection of data from a plurality of sensors and management of the plurality of sensors for improving security of our communities, e.g., by detecting radiation, etc. Further, there is a need to provide relevant information based on the sensors in an efficient manner to increase security. According to some embodiments, one or more sensor readings or associated derived data may be displayed in a graphical user interface (GUI) for user manipulation. For example, the operator can scroll through, e.g., rewind, forward, play, pause, etc., information, e.g., sensor readings, change of state of sensor(s), condition being met by one or more sensors, etc., over a time period of interest. It is appreciated that the time period of interest may be user selectable, e.g., from a week ago to present time including real-time data, etc. As such, occurrence of a possible event, e.g., possible terrorist activity, possible radiation from a bio-hazardous material, etc., may be detected using playback functionality of the GUI, thereby circumventing a catastrophic event.

Furthermore, a need has arisen to complement the sensor based detection system with surveillance footage. According to some embodiments, surveillance footage may provide additional information regarding sensor(s) readings that are within the same physical proximity, e.g., within the line of sight, within the same room, within the same building, outside of the building monitoring the entrance to the building, etc. As a result, the sensor based detection system equipped with a surveillance system results in a preventative system as well as a punitive one.

According to some embodiments, a system may include a sensor, a visual capturing device, and a controller. The sensor, e.g., thermal sensor, electromagnetic sensor, mechanical sensor, motion sensor, biological/chemical sensor, Geiger counter etc., may be configured to measure a value, e.g., thermal value, electromagnetic value, radiation value, etc., associated with an input, according to some embodiments. The visual capturing device, e.g., video camera, digital camera, etc., may be configured to capture visual data e.g., video frames, pictures, etc. In some embodiments, the controller may be configured to cause the measured value and the captured visual data to be rendered on a display device simultaneously.

Embodiments provide methods and systems for monitoring and managing a variety of network (e.g., internet protocol (IP)) connected sensors. Embodiments are configured to allow monitoring (e.g., continuous real-time monitoring, sporadic monitoring, scheduled monitoring, etc.) of sensors and associated sensor readings or data (e.g., ambient sensor readings). For example, gamma radiation levels may be monitored in the context of background radiation levels. Accordingly, a significant change in the background gamma radiation levels may indicate a presence of hazardous radioactive material, (e.g., bomb, etc.). As a result, appropriate actions may be taken to avert a possible security breach, terrorist activity, etc. Embodiments may support any number of sensors and may be scaled upwards or downwards as desired. Embodiments thus provide a universal sensor monitoring, management, and alerting platform.

Embodiments provide analytics, archiving, status (e.g., real-time status, sporadic monitoring, scheduled monitoring, etc.), GUI based monitoring and management to enable one to scroll through sensor(s) reading and/or captured surveillance footage over time. In some embodiments, the system may include a messaging system to alert the community regarding certain risks. Embodiments may provide a solution for monitoring, managing, alerting, and messaging related to certain sensor detection, e.g., gamma radiation detection, air quality detection, water and level quality detection, fire detection, flood detection, biological and chemical detection, air pressure detection, particle count detection, movement and vibration detection, etc. For example, the embodiments may provide a solution for monitoring and tracking movement of hazardous materials or conditions, thereby allowing initiation of public responses and defense mechanisms. Embodiments may allow previously installed devices (e.g., surveillance cameras, smartphones, vibration detection sensors, carbon monoxide detection sensors, particle detection sensors, air pressure detection sensors, infrared detection sensors, etc.) to be used as sensors to detect hazardous conditions (e.g., radioactive, biological, chemical, etc.).

Embodiments may be used in a variety of environments, including public places or venues (e.g., airports, bus terminals, stadiums, concert halls, tourist attractions, public transit systems, etc.), organizations (e.g., businesses, hospitals, freight yards, government offices, defense establishments, nuclear establishments, laboratories, etc.), etc. For example, embodiments may be used to track sensitive material (e.g., nuclear, biological, chemical, etc.) to ensure that it is not released to the public and prevent introduction of the material into public areas. Embodiments may thus be further able to facilitate a rapid response to terrorist threats (e.g., a dirty bomb). It is appreciated that the embodiments described herein are within the context of radiation detection and gamma ray detection for merely illustrative purposes and are not intended to limit the scope.

FIG. 1 shows an operating environment in accordance with some embodiments. The operating environment 100 includes a sensor based detection system 102, a network 104, a network 106, a messaging system 108, sensors 110-120, and visual capturing device(s) 130. The sensor based detection system 102 and the messaging system 108 are coupled to a network 104. The sensor based detection system 102 and messaging system 108 are communicatively coupled via the network 104. The sensor based detection system 102, sensors 110-120, and visual capturing device(s) 130 are coupled to a network 106. The sensor based detection system 102, sensors 110-120, and visually capturing device(s) 130 are communicatively coupled via network 106. Networks 104, 106 may include more than one network (e.g., intranets, the Internet, local area networks (LAN)s, wide area networks (WAN)s, wireless local area network (WiFi), etc.) and may be a combination of one or more networks including the Internet. In some embodiments, network 104 and network 106 may be a single network.

The sensors 110-120 detect a reading associated therewith, e.g., gamma radiation, vibration, heat, motion, etc., and transmit that information to the sensor based detection system 102 for analysis. The sensor based detection system 102 may use the received information and compare it to a threshold value, e.g., historical values, user selected values, etc., in order to determine whether a potentially hazardous event has occurred. In response to the determination, the sensor based detection system 102 may transmit that information to the messaging system 108 for appropriate action, e.g., emailing the appropriate personnel, sounding an alarm, tweeting an alert, alerting the police department, alerting the homeland security department, etc. Accordingly, appropriate actions may be taken in order to respond to the risk.

It is appreciated that the sensor based detection system 102 may provide the sensor readings or any information derived therefrom in a GUI. For example, readings from various sensors may be displayed over time such that their historical readings may be compared to their current readings, etc. In some embodiments, derived information from the sensor readings may be rendered on the GUI. For example, the state of the sensor may be displayed, e.g., whether the sensor is in normal mode, elevated mode, highly elevated mode, etc., over time. In other words, the GUI may enable a user to scroll through sensor readings or derived information therefrom over time, e.g., the time may be user selected.

According to some embodiments, the sensor based detection system 102 may receive visual data and queues from the visual capturing devices 130. In some embodiments, the visual capturing device(s) 130 are associated with one or more of the sensors 110-120. Data captured, e.g., stilled footage, video frame, infrared information, etc., from the visual capturing device(s) 130 may complement information received from the sensors 110-120. For example, sensor readings or derived information from the sensors may be displayed on a GUI as well as the visual data that was captured, thereby making it easier to detect a possible hazardous situation. As an illustrative example, an elevated reading from one or more sensors 110-120 may cause one to inspect footage from the visual capturing device(s) 130, therefore identifying a leak in a pipe, identifying a possible terrorist setting up a bomb, etc.

The sensors 110-120 may be any of a variety of sensors including thermal sensors (e.g., temperature, heat, etc.), electromagnetic sensors (e.g., metal detectors, light sensors, particle sensors, Geiger counter, charge-coupled device (CCD), etc.), mechanical sensors (e.g. tachometer, odometer, etc.), complementary metal-oxide-semiconductor (CMOS), biological/chemical (e.g., toxins, nutrients, etc.), etc. The sensors 110-120 may further be any of a variety of sensors or a combination thereof including, but not limited to, acoustic, sound, vibration, automotive/transportation, chemical, electrical, magnetic, radio, environmental, weather, moisture, humidity, flow, fluid velocity, ionizing, atomic, subatomic, navigational, position, angle, displacement, distance, speed, acceleration, optical, light imaging, photon, pressure, force, density, level, thermal, heat, temperature, proximity, presence, radiation, Geiger counter, crystal based portal sensors, biochemical, pressure, air quality, water quality, fire, flood, intrusion detection, motion detection, particle count, water level, surveillance cameras, etc. The sensors 110-120 may be video cameras (e.g., IP video cameras) or purpose built sensors.

The sensors 110-120 and visual capturing device(s) 130 may be fixed in location (e.g., surveillance cameras or sensors), semi-fixed (e.g., sensors on a cell tower on wheels or affixed to another semi portable object), mobile (e.g., part of a mobile device, smartphone, etc.), or any combination thereof. The sensors 110-120 may provide data to the sensor based detection system 102 according to the type of the sensors 110-120. For example, sensors 110-120 may be CMOS sensors configured for gamma radiation detection. Gamma radiation may thus illuminate a pixel, which is converted into an electrical signal and sent to the sensor based detection system 102.

The sensor based detection system 102 is configured to receive data and manage sensors 110-120. The sensor based detection system 102 is configured to assist users in monitoring and tracking sensor readings or levels at one or more locations. The sensor based detection system 102 may have various components that allow for easy deployment of new sensors within a location (e.g., by an administrator) and allow for monitoring of the sensors to detect events based on user preferences, heuristics, etc. The events may be used by the messaging system 108 to generate sensor-based alerts (e.g., based on sensor readings above a threshold for one sensor, based on the sensor readings of two sensors within a certain proximity being above a threshold, etc.) in order for the appropriate personnel to take action. The sensor based detection system 102 may receive data and manage any number of sensors, which may be located at geographically disparate locations. In some embodiments, the sensors 110-120 and components of a sensor based detection system 102 may be distributed over multiple systems (e.g., and virtualized) and a large geographical area.

It is appreciated that the information received from one or more sensors, e.g., sensors 110-120, may be complemented with data captured using the visually capturing device(s) 130. For example, visually captured data from one or more video camera, still camera, infrared camera, etc., may also be gathered and transmitted to the sensor based detection system 102 for processing. Accordingly, detection of a possible hazardous situation becomes easier, e.g., leak from a pipe, possible terrorist transporting bio-hazardous material, etc. As such, circumventing the possible hazardous situation becomes easier and the information may be used, for example, in adjudication of a terrorist attack. It is appreciated that in some embodiments visual capturing of data is initiated in response to one or more sensors satisfying a certain condition, e.g., sensor readings above a certain threshold. In some embodiments, the visually captured data may be time stamped and stored for later retrieval.

The sensor based detection system 102 may track and store location information (e.g., board room B, floor 2, terminal A, etc.) and global positioning system (GPS) coordinates, e.g., latitude, longitude, etc. for each sensor, or group of sensors as well as for the visual capturing device(s) 130. The sensor based detection system 102 may be configured to monitor sensors and track sensor values to determine whether a defined event has occurred, e.g., whether a detected radiation level is above a certain threshold, etc. It is appreciated that the sensor based detection system 102 may be configured to also monitor, track and store data associated with visual capturing device(s) 130. It is appreciated that in some embodiments, data may be captured by the visual capturing device(s) 130 when the sensor(s) satisfies a certain condition, e.g., sensor(s) readings at a certain threshold, above a certain threshold, etc. However, in other embodiments data from the visual capturing devices 130 may occur in absence of a certain condition being satisfied by the sensor(s).

The sensor based detection system 102 may determine a route or path of travel that dangerous or contraband material is taking around or within range of the sensors. For example, the path of travel of radioactive material relative to fixed sensors may be determined and displayed via a GUI. It is appreciated that the path of travel of radioactive material relative to mobile sensors, e.g., smartphones, etc., or relative to a mixture of fixed and mobile sensors may similarly be determined and displayed via a GUI. It is appreciated that the analysis and/or the sensed values may be displayed in real-time or stored for later retrieval. The GUI enables the user to scroll through events in sequence by playing, fast forwarding, rewinding, pausing, etc.

The visual capturing device(s) 130 may be controlled by the sensor based detection system 102. For example, after the sensor based detection system 102 determines a route or path of travel, the visual capturing device(s) may be reoriented and/or refocused to capture the path of travel in real-time. In other words, the visual capturing device(s) may move, sweep, or become oriented based on measured information by the sensor(s) and as determined by the sensor based detection system 102. The visual capturing device(s) may respond as sensors measure values and as the sensors are activated and de-activated. Groups of visual capturing devices may also be employed to maximize coverage of the route, or predicted path of travel. For example, the visual capturing device nearest the activated sensor may focus on the precise location of the sensor, while other visual capturing devices in the area may pan across the room/area to increase coverage.

The sensor based detection system 102 may display a GUI for monitoring and managing sensors 110-120 as well as the visual capturing device(s) 130. The GUI may be configured for indicating sensor readings, sensor status, sensor locations on a map, etc., as well as rendering captured data by the visual capturing device(s) 130, their respective locations on a map, etc. The sensor based detection system 102 may allow review of past sensor readings and movement of sensor detected material or conditions based on stop, play, pause, fast forward, and rewind functionality of stored sensor values as well as the captured visual data by the visual capturing device(s) 130. The sensor based detection system 102 therefore allows viewing of image or video footage corresponding to sensors that had sensor readings above a threshold (e.g., based on a predetermined value or based on ambient sensor readings). For example, a sensor may be selected in a GUI and video footage associated with an area within a sensor's range of detection may be displayed, thereby enabling a user to see an individual transporting hazardous material. According to one embodiment the footage is displayed in response to a user selection or it may be displayed automatically in response to a certain event, e.g., sensor reading associated with a particular sensor or group of sensors being above a certain threshold.

In some embodiments, sensor readings of one or more sensors may be displayed on a graph or chart for easy viewing. A visual map-based display depicting sensors may be displayed with the sensors color coded according to the sensors' readings and certain events. For example, gray may be associated with a calibrating sensor, green may be associated with a normal reading from the sensor, yellow may be associated with an elevated sensor reading, orange associated with a potential hazard sensor reading, and red associated with a hazard alert sensor reading. It is appreciated that a representation of the visual capturing device(s) 130 may similarly be displayed in the GUI similar to the sensors (as presented above). Captured data by the visual capturing device(s) 130 may also be rendered on the GUI.

The sensor based detection system 102 may determine alerts or sensor readings above a specified threshold (e.g., predetermined, dynamic, or ambient based) or based on heuristics and display the alerts in the GUI. The sensor based detection system 102 may allow a user (e.g., operator) to group multiple sensors together to create an event associated with multiple alerts from multiple sensors. For example, a code red event may be created when three sensors or more within twenty feet of one another and within the same physical space have a sensor reading that is at least 40% above the historical values. In some embodiments, the sensor based detection system 102 may automatically group sensors together based on geographical proximity of the sensors, e.g., sensors of gates 1, 2, and 3 within terminal A at LAX airport may be grouped together due to their proximate location with respect to one another, e.g., physical proximity within the same physical space, whereas sensors in different terminals may not be grouped because of their disparate locations. However, in certain circumstances sensors within the same airport may be grouped together in order to monitor events at the airport and not at a more granular level of terminals, gates, etc. In other words, sensors may be grouped and scaled as desired.

It is appreciated that visual capturing device(s) 130 may similarly be grouped, managed, and captured information therefrom may be stored for later retrieval or it may be rendered without storing it. According to some embodiments, the visual capturing devices 130 may be grouped with one another and/or with sensors 110-120.

The sensor based detection system 102 may send information to a messaging system 108 based on the determination of an event created from the information collected from the sensors 110-120 and/or visual capturing device(s) 130. The messaging system 108 may include one or more messaging systems or platforms which may include a database (e.g., messaging, SQL, or other database), short message service (SMS), multimedia messaging service (MMS), instant messaging services, Twitter™ available from Twitter, Inc. of San Francisco, Calif., Extensible Markup Language (XML) based messaging service (e.g., for communication with a Fusion center), JavaScript™ Object Notation (JSON) messaging service, etc. For example, national information exchange model (NIEM) compliant messaging may be used to report chemical, biological, radiological and nuclear defense (CBRN) suspicious activity reports (SARs) to report to government entities (e.g., local, state, or federal government).

Figure 2:
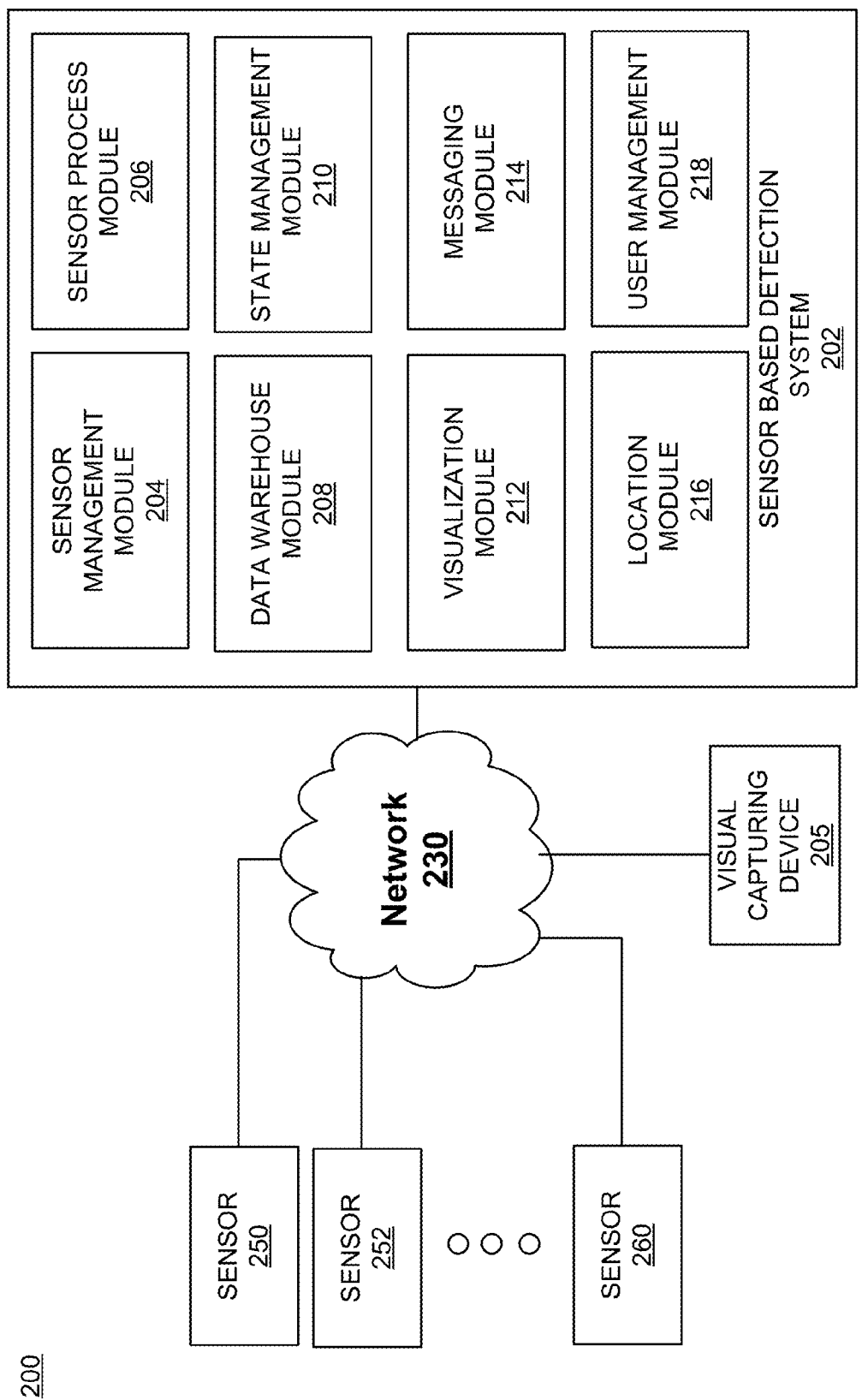
FIG. 2 shows components of a sensor based detection system in accordance with some embodiments.

FIG. 2 shows components of a sensor based detection system in accordance with some embodiments. Diagram 200 includes sensors 250-260, a network 230, a sensor based detection system 202, and a visual capturing device(s) 205. The sensor based detection system 202, sensors 250-260, and the visual capturing device(s) 205 are communicatively coupled via network 230. The network 230 may include more than one network (e.g., intranets, the Internet, LANs, WANs, etc.) and may be a combination of one or more networks including the Internet. In some embodiments, the sensors 250-260 may be substantially similar to sensors 110-120 and may be any of a variety of sensors, as described herein. It is appreciated that the visual capturing device(s) 205 may be substantially similar to the visual capturing device(s) 130 and it may operate substantially in similar fashion.

The sensor based detection system 202 may access or receive data from the sensors 250-260. It is appreciated that the detection system 202 may also receive surveillance footage from visual capturing device(s) 205. According to some embodiments, the surveillance footage is received regardless of the status of the sensors, however, in some embodiments the surveillance footage is received when one or more sensors satisfy a certain condition, e.g., detected measurement exceeding a certain threshold, a majority of the sensors registering a certain change in status, etc.

The sensor based detection system 202 may include a sensor management module 204, a sensor process module 206, a data warehouse module 208, a state management module 210, a visualization module 212, a messaging module 214, a location module 216, and a user management module 218.

In some embodiments, the sensor based detection system 202 may be distributed over multiple servers (e.g., physical or virtual machines). For example, a domain server may execute the data warehouse module 208 and the visualization module 212, a location server may execute the sensor management module 204 and one or more instances of a sensor process module 206, and a messaging server may execute the messaging module 214. For example, multiple location servers may each be located at respective sites having 100 sensors, and provide analytics to a single domain server, which provides a monitoring and management interface (e.g., GUI) and messaging services. The domain server may be centrally located while the location servers may be located proximate to the sensors for bandwidth purposes.

The sensor management module 204 is configured to monitor and manage the sensors 250-260. The sensor management module 204 is configured to initiate one or more instances of sensor process module 206 for monitoring and managing sensors 250-260. The sensor management module 204 is operable to configure a new sensor process (e.g., an instance of sensor process module 206) when a new sensor is installed. The sensor management module 204 may thus initiate execution of multiple instances of the sensor process module 206. In some embodiments, an instance of the sensor process module 206 is executed for each sensor. For example, if there are 50 sensors, 50 instances of sensor process module 206 are executed in order to configure the sensors.

It is further appreciated that the sensor management module 204 may also be operable to configure an already existing sensor. For example, sensor 252 may have been configured previously, however, the sensor management module 204 may reconfigure sensor 252 based on the new configuration parameters. The sensor management module 204 may be configured as an aggregator and collector of data from the sensors 250-260 via sensor process module 206. Sensor management module 204 is configured to send data received via instances of sensor process module 206 to a data warehouse module 208.

The sensor management module 204 further allows monitoring of one or more instances of the sensor process module 206 to determine whether an instance of the sensor process module 206 is running properly or not. In some embodiments, the sensor management module 204 is configured to determine the health of one or more sensors including if a sensor has failed based on, for example, whether an anticipated or predicted value is received within a certain time period. The sensor management module 204 may further be configured to determine whether data is arriving on time and whether the data indicates that the sensor is functioning properly (e.g. healthy) or not. For example, a radiation sensor may be expected to provide a certain microsievert (mSv) value within a given time period. In some embodiments, the anticipated value may be received from an analytics engine that analyzes the sensor data. In some embodiments, the sensor management module 204 may be configured to receive an indicator of status from a sensor (e.g., an alive signal, an error signal, or an on/off signal). The health information may be used for management of the sensors 250-260 and the health information associated with the sensors may be stored in the data warehouse 208.

The sensor management module 204 may further access and examine the outputs from the sensors based on a predictable rate of output. For example, an analytics process (e.g., performed by the sensor process module 206) associated with a sensor may produce a record every ten seconds and if a record is not received (e.g., within multiple 10 second periods of time), the sensor management module 204 may stop and restart the analytics process. In some embodiments, the record may be a flat file.

The sensor process module 206 is configured to receive data (e.g., bulk or raw data) from sensors 250-260. In some embodiments, the sensor process module 206 may form a record (e.g. a flat file) based on the data received from the sensors 250-260. The sensor process module 206 may perform analysis of the raw data (e.g., analyze frames of video to determine sensor readings). In some embodiments, the sensor process module 206 may then pass the records to the sensor management module 204.

The data warehouse module 208 is configured to receive data from sensor management module 204. The data warehouse module 208 is configured for storing sensor readings and metadata associated with the sensors. Metadata for the sensors may include their respective geographical information (e.g., GPS coordinates, latitude, longitude, etc.), description of the sensor and its location, e.g., sensor at gate 1 terminal A at LAX, etc. In some embodiments, the data warehouse module 208 may be configured to determine state changes based on monitoring (e.g., real-time monitoring) of the state of each sensor and the state of the sensor over a time interval (e.g., 30 seconds, 1 minute, 1 hour, etc.). In some embodiments, the data warehouse module 208 is configured to generate an alert (e.g., when a sensor state has changed and is above a threshold, when a sensor reading satisfies a certain condition such as being below a threshold, etc.). The generated alert may be sent to visualization module 212 for display (e.g., to a user). Changes in sensor state may thus be brought to the attention of a user (e.g., operator). It is appreciated that the threshold values may be one or more historical values, safe readings, operator selected values, etc.

It is appreciated that other information may similarly be displayed via the visualization module 212. For example, actual reading of the sensor may be displayed on the GUI that displays a geographical map and the sensor located therein. It is appreciated that additional information may be displayed in response to a user selection, e.g., GPS coordinates of the sensor may be displayed when the user selects the displayed sensor, the type and brand of the sensor may be displayed when the user selects the displayed sensor, etc. It is appreciated that the visualization module 212 displaying the GUI with the sensor readings may also display a playback functionality for sensors such that the user can scroll back and forth in time, play, pause, etc., to see measurements by the sensors in different time intervals. It is also appreciated that according to some embodiments, the playback functionality may be complemented with the surveillance footage captured by the visual capturing device(s) 205, similar to FIG. 1.

In some embodiments, the data warehouse module 208 may be implemented in a substantially similar manner as described in Philippines Patent Application No. 1-2013-000136 entitled "A Domain Agnostic Method and System for the Capture, Storage, and Analysis of Sensor Reading", by Ferdinand E. K. De Antoni which is incorporated by reference herein.

The state management module 210 may read data from the data warehouse module 208 and/or from the sensor management module 204 (e.g., data that was written by sensor management module 204) and determine whether a state change has occurred. The state change may be determined based on a formula to determine whether there has been a change since a previous record in time for an associated sensor and may take into account ambient sensor readings. If there is a change in state, an alert may be triggered. It is appreciated that state may also be a range of values. One or more alerts may be assembled (e.g., into a data structure) referred to as an event. The event may then be accessed by or sent to a visualization module 212. The visualization module 212 may then display the change in state, an alert, or an event. In some embodiments, the visualization module 212 may receive input to have the alert sent to an external system (e.g., a messaging system). It is appreciated that the visualization module 212 may display a playback functionality for rendered information, e.g., the state, alert, events, measurement readings from sensors, etc. As such, the operator may scroll through values, states, events, alerts, etc., over any time interval of interest.

The visualization module 212 is configured for use in monitoring a location for potential sensor based alerts. The visualization module 212 may provide a GUI to monitor and manage each of the deployed sensors. In some embodiments, the visualization module 212 is configured to provide a tree filter to view each of the sensors in a hierarchical manner, as well as a map view, thereby allowing monitoring of each sensor in a geographical context. The visualization module 212 may further allow creation of an event case file to capture sensor alerts at any point in time and escalate the sensor alert to appropriate authorities for further analysis (e.g., via a messaging system). The visualization module 212 may display a path of travel or route of hazardous materials or conditions based on sensor readings and the associated sensor locations. The visualization module 212 may further be used to zoom in and zoom out on a group of sensors, e.g., sensors within a terminal at an airport, etc. As such, the information may be displayed as granular as desired by the operator. Visualization module 212 may also be used and render information in response to a user manipulation. For example, in response to a user selection of a sensor, e.g., sensor 260, the sensor readings associated with the sensor may be displayed. In another example, a video feed associated with the sensor may also be displayed (e.g., simultaneously).

The messaging module 214 is configured to send messages to other systems or messaging services including, but not limited to, a database (e.g., messaging, SQL, or other database), short message service (SMS), multimedia messaging service (MMS), instant messaging services, Twitter available from Twitter, Inc. of San Francisco, Calif., Extensible Markup Language (XML) based messaging service (e.g., for communication with a Fusion center), JavaScript Object Notation (JSON) messaging service, etc. In one example, national information exchange model (NIEM) compliant messaging may be used to report chemical, biological, radiological and nuclear defense (CBRN) suspicious activity reports (SARs) to report to government entities (e.g., local, state, or federal government). In some embodiments, the messaging module 214 may send messages based on data received from the sensor management module 204. It is appreciated that the messages may be formatted to comply with the requirement/standards of the messaging service used. For example, as described above a message may be formed into the NIEM format in order to repot a CBRN event.

The location module 216 is configured for mapping and spatial analysis (e.g., triangulation) in order to graphically represent the sensors within a location. For example, location module 216 may be configured to facilitate display of the location of and associated icons for sensors at each gate of an airport terminal In some embodiments, the sensor management module 204 is configured to store geographical data associated with a sensor in a data store (not shown) associated with location module 216. In some embodiments, the location module 216 may operate in conjunction with ArcGIS from ERSI, Inc. of Redlands, Calif. It is appreciated that the location module 216 may be used to provide mapping information associated with the sensor location such that the location of the sensor may overlay the map, e.g., location of the sensor may overlay the map of LAX airport, etc.

The user management module 218 is configured for user management and storage of user identifiers of operators and administrators. The user management portion may be integrated with an existing user management systems (e.g., OpenLDAP or Active Director) thereby enabling use of existing user accounts to operate sensor the based detection system 202.

Figure 3A:
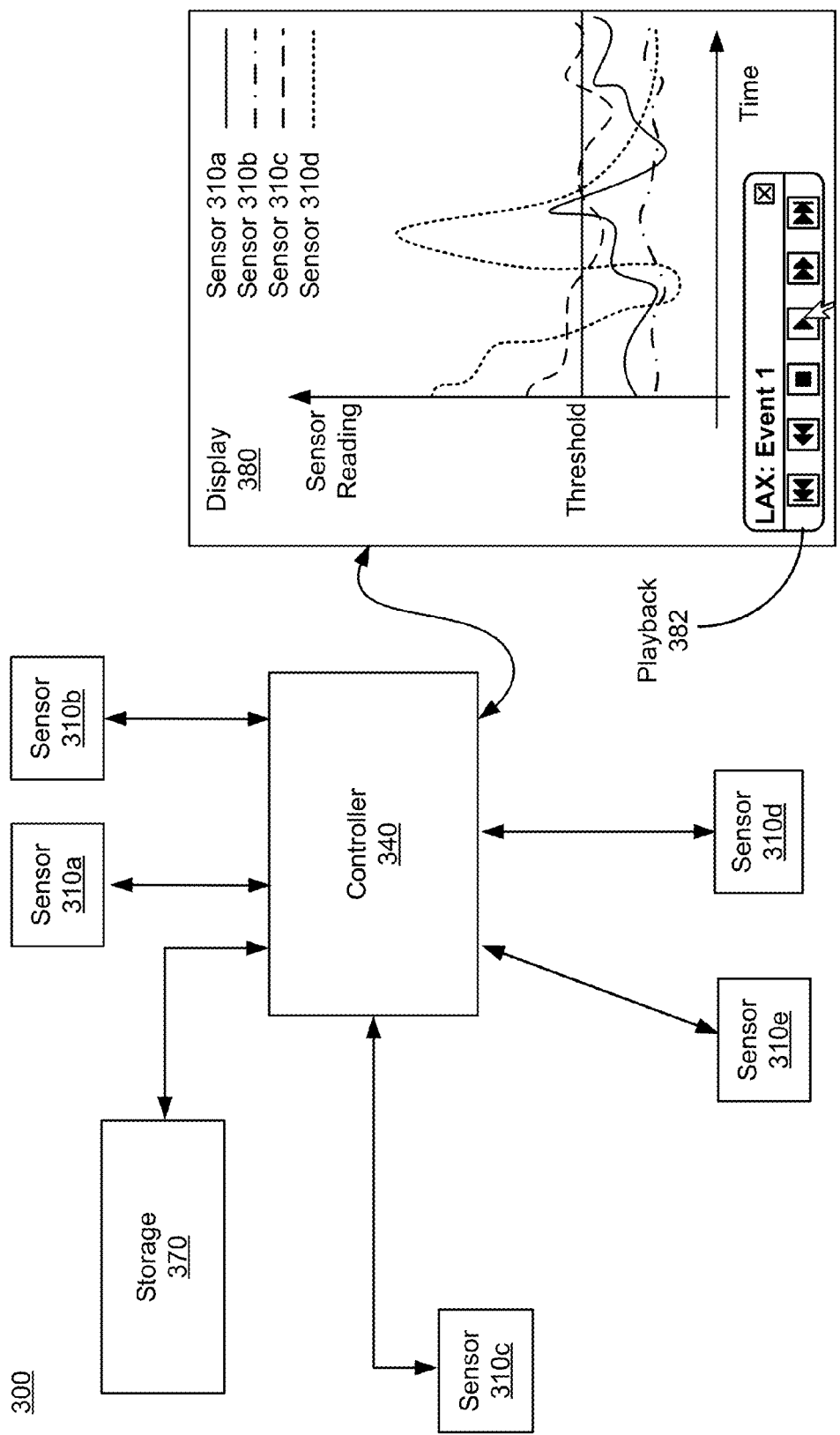
FIGS. 3A-3C show a sensor based system with playback in accordance with some embodiments.
Figure 3B:
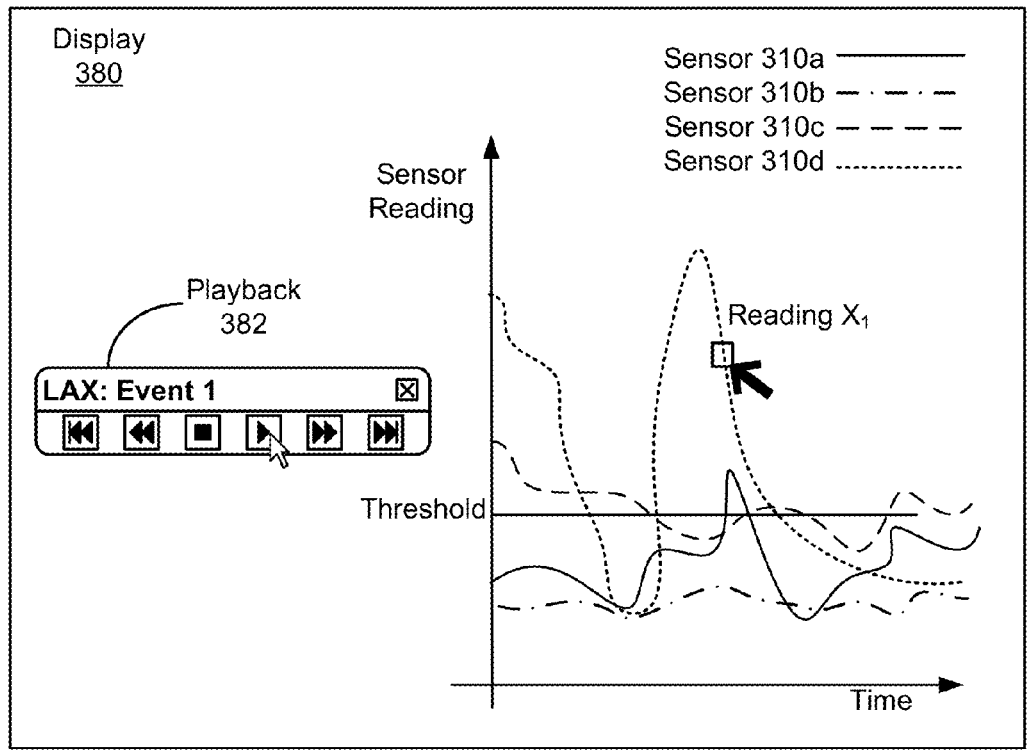
Figure 3C:
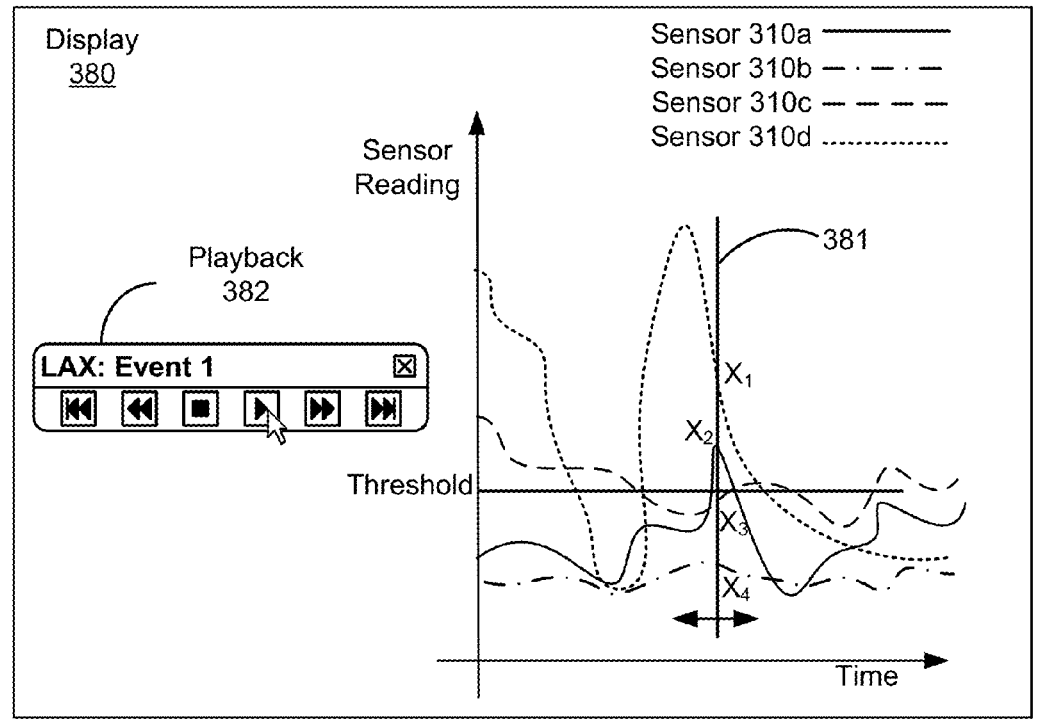

Referring now to FIGS. 3A-3C, a sensor based system with playback in accordance with some embodiments is shown. Referring more specifically to FIG. 3A, system 300 is shown. System 300 includes sensors 310a, 310b, 310c, 310d, 310e, a storage 370 component, a controller 340, and a display device 380.

According to some embodiments, the sensors 310a-310e measure values associated with their respective input(s). Sensors 310a-310e may be any combination of sensors described in FIG. 1 and may measure any combination of values associated with their respective inputs, as described in FIG. 1. The measured information by sensors 310a-310e may be transmitted to the controller 340 for processing. The processed information and/or raw data received from the sensors may be stored in the storage 370 component for later retrieval. Raw information, processed information, sensor related information, or any combination thereof may be rendered on the display device 380 as a GUI.

The controller 340 may process the received information e.g., measured values, information associated with the sensors, etc., to generate derived information, e.g., state of sensor (e.g., normal state, elevated state, critical state, calibration state, etc.), change in state (e.g., change from normal to elevated, change from critical to elevated, etc.), etc. In some embodiments, the measured information by the sensors 310a-310e may be stored in the storage 370 component, either directly (not shown) or through the controller 340. It is appreciated that according to some embodiments, the controller 340 may cause the generated derived information to be stored in the storage 370 component. In some embodiments, the controller 340 may render the received information or any information derived therefrom to be displayed on the display device 380 as a GUI. It is further appreciated that the controller 340 may render information associated with the sensors, e.g., name of the sensor, sensor type, geo-locational position of the sensor, metadata associated with the sensor, etc., as a GUI on the display device 380.

In some embodiments, the measured data by the sensors 310a-310e, and/or the derived data from the measured data may be time stamped. Time stamping of the measured data and/or the derived data therefrom may occur automatically, e.g., time stamping every measured value, time stamping every other measured value, time stamping in a certain interval, etc. In some embodiments, time stamping the measured data and/or the derived data therefrom may be based on satisfaction of certain conditions, e.g., the sensor reading exceeding a threshold, a group of sensor readings exceeding a threshold within a certain period, etc. In some embodiment, time stamping the measured data and/or derived data therefrom may be responsive to a user selection to time stamp.

The display device 380 may render information, e.g., measured values, derived information, etc., associated with any combination of sensors, e.g., sensors 310a-310d but not 310e. The measured values and/or derived information may include historical and/or real-time values. FIG. 3A shows rendering of measured values for sensors 310a-310d for illustrative purposes but it is not limited thereto, e.g., derived information may be rendered. Display device 380 renders the sensors readings, and the threshold value of interest, e.g., temperature of interest, vibration of interest, radiation of interest, etc., over time. Accordingly, the user can identify the time which any given sensor has a reading above or below the threshold value of interest. It is appreciated that rendition of the threshold value is for illustrative purposes only and should not be construed as limiting the scope of the embodiments. It is also appreciated that throughout the application rendition of sensor reading is discussed for illustrative purposes but the embodiments should not be construed as limiting the scope. For example, the sensor reading may include derived information, etc., as discussed above.

It is appreciated that the time interval may be user adjusted, e.g., the user may select to display measured values for the past 1 hour, the user may select to display measured values between 3 pm to 6 pm on Sep. 16, 2008, etc. According to some embodiments, the time interval of interest may be selected using a pop-up window, drop-down menu, etc.

According to some embodiments, the display device 380 may also render a playback device 382. The playback device 382 enables the user to scroll through the time interval of interest in sequence. The playback device 382 may include various functionalities, e.g., play, stop, pause (not shown), fast forward, rewind, next chapter, previous chapter, etc. In other words, the user may see changes in measured values for each sensor for the time interval of interest. In this illustrative embodiment, the playback device 382 is associated with an event at LAX for sensors 310a-310d over a time interval of interest.

The playback device 382 can be used to provide further insight and may further help in drawing certain conclusions. For example, the playback device 382 may reveal elevated readings and spike by sensors 310a-310d in that chronological order over a short amount of time. Knowing that sensors 310a-310d are within a certain physical proximity of one another and form a daisy chain topology, e.g., sensor 310a close to sensor 310b close to sensor 310c close to sensor 310d, and if the spike in measured values are in the same sequence may lead one to infer that an event occurring between sensors 310a-310d caused the spike in reading, e.g., bio-hazardous material was being transported from physical proximity of sensor 310a to 310d. It is appreciated that the example provided above is merely for illustrative purposes on how the playback device 382 may be used and should not be construed as limiting the embodiments. For example, the playback device 382 may be used to create an event, e.g., create conditions that when satisfied trigger an alarm, based on historical analysis of the sensors.

Referring now to FIG. 3B, rendition of measured value, e.g., reading X1, for sensor 310d is shown. According to some embodiments, the user may select, e.g., by clicking, the sensor reading of interest at a given time of interest to show the measured value at the time of interest. In some embodiments, the user may cause the sensor reading at the given time of interest to be displayed by hovering the pointing device, e.g., mouse, over the sensor reading at given time of interest.

Referring now to FIG. 3C, measured values at a given time associated with each sensor, e.g., sensors 310a-310d, may be displayed as the user manipulated the moving window 381 of the GUI. For example, manipulating the moving window 381 to the left or to the right enables the user to see measured values X1-X4 associated with sensors 310a-310d respectively. It is appreciated that in some embodiments, the moving window 381 may include two vertical lines (not shown) in order to also select the time interval of interest.

Figure 4A:
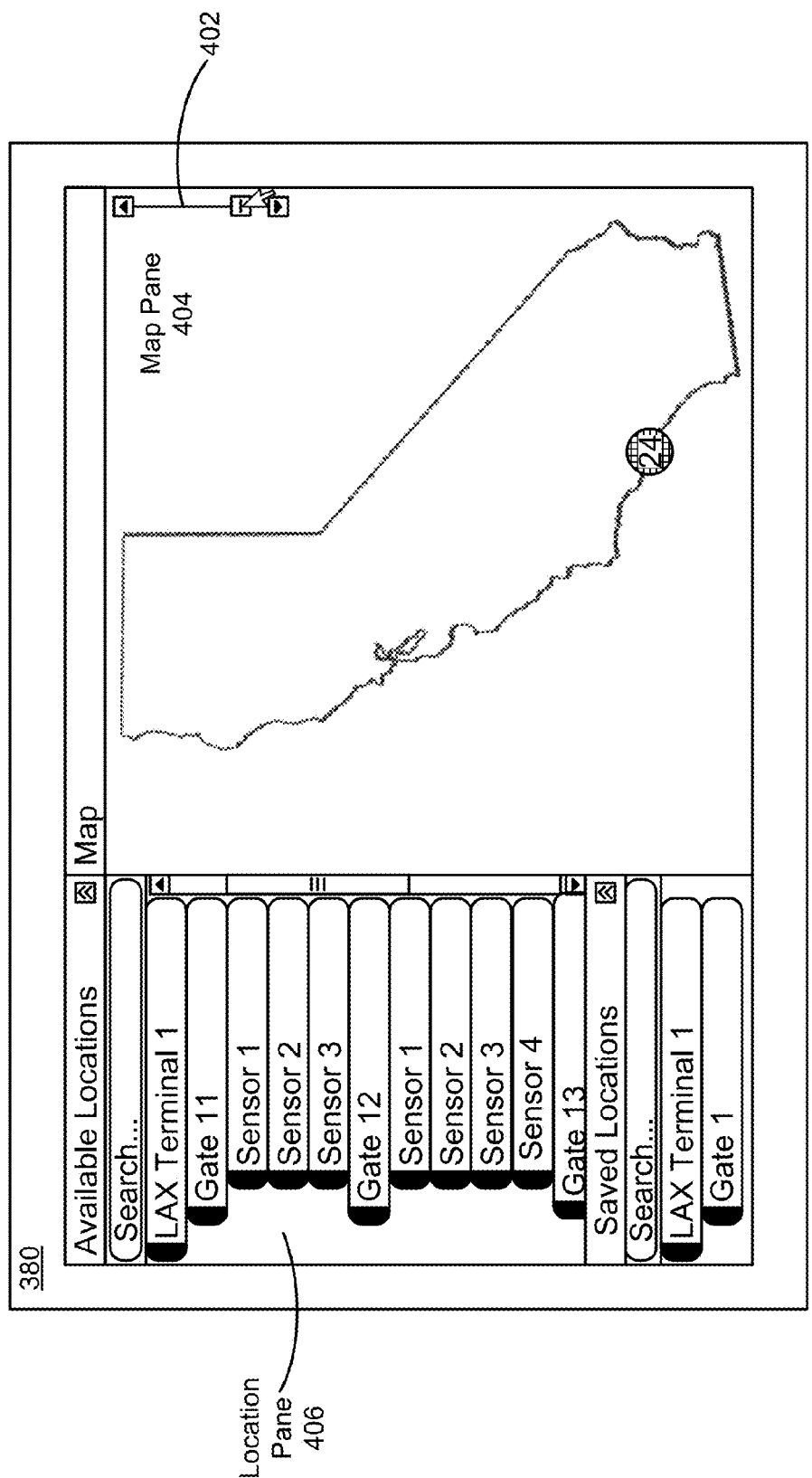
FIGS. 4A-4C show a sensor based system with playback graphical user interface in accordance with some embodiments.
Figure 4B:
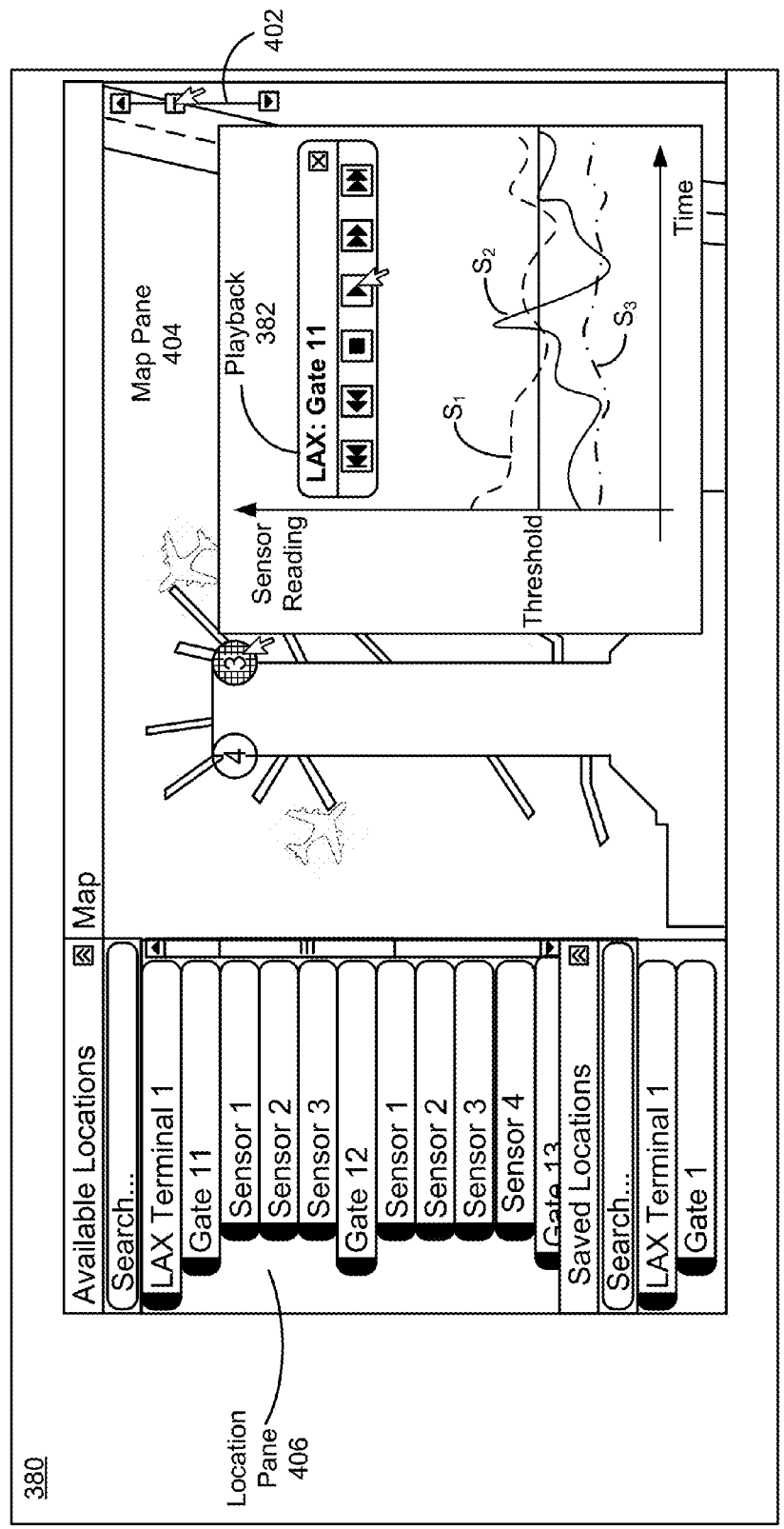
Figure 4C:
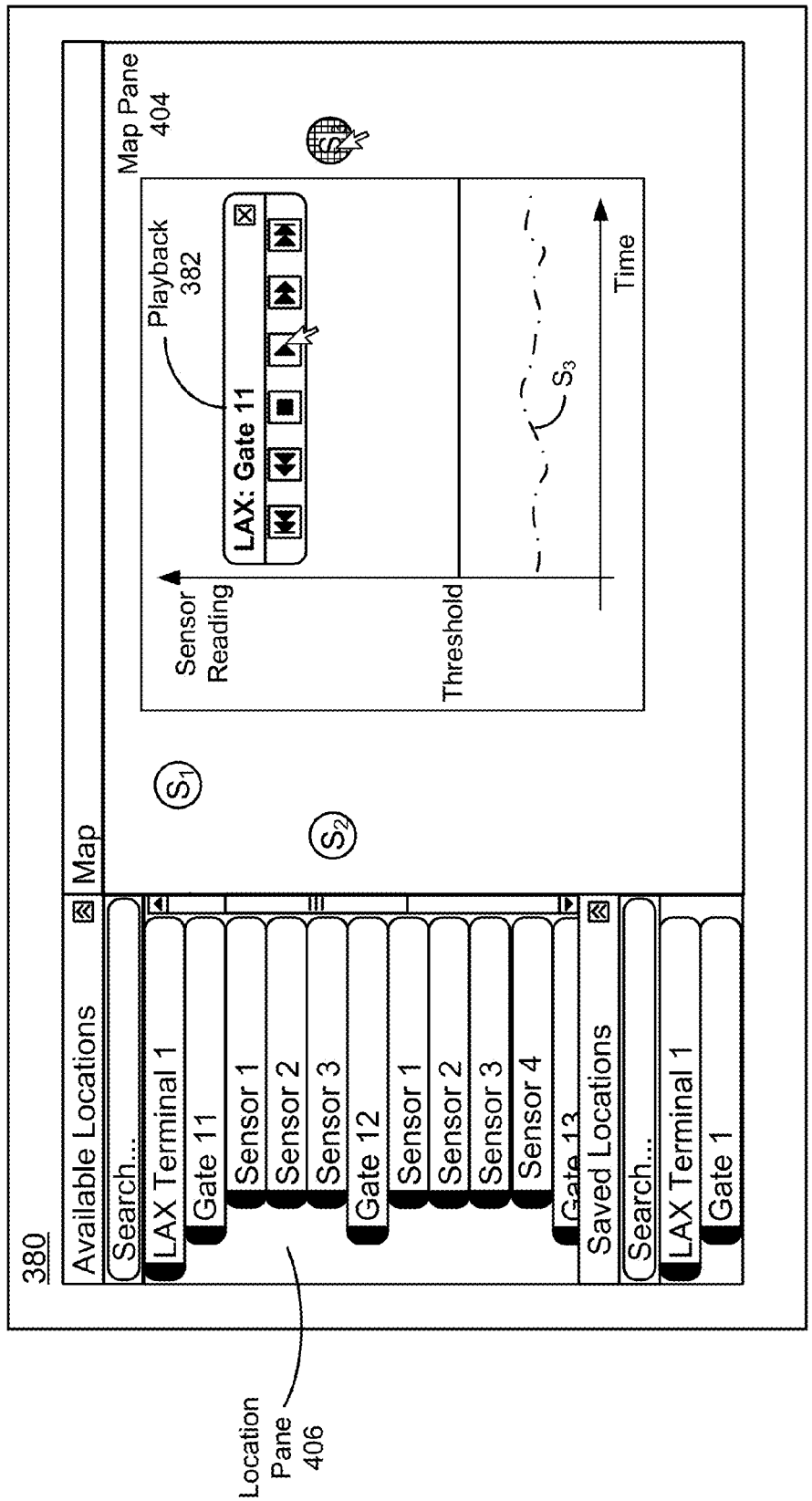

Referring now to FIGS. 4A-4C, a sensor based system with playback graphical user interface in accordance with some embodiments is shown. Referring to FIG. 4A, the display device 380 may render a map pane 404 and location pane 406. The map pane 404 may display the map associated with sensors. In this illustrative embodiment, the map of California is displayed with 24 sensors located in Southern California. It is appreciated that information displayed on the map may be zoomed in and zoomed out as desired using various tools, e.g., zooming device 402. In response to zooming in/out the sensors may be collapsed into groups, e.g., based on geographical location, based on type, etc., and expanded out accordingly.

It is appreciated that rendition on the map pane 404 may be controlled by manipulating the location pane 406. The location pane 406 may include available locations for the sensors, search box for finding sensors of interest, and it may further display the locational information in hierarchical format, e.g., LAX Terminal 1 gate 11 having 3 sensors, LAX Terminal 1 gate 12 having 4 sensors, etc. The location pane 406 may further include saved locations of interest with its own search tool.

Referring now to FIG. 4B, zooming in on some of the 24 sensors is shown. For example, once the user further zooms in using the zooming tool 402, seven sensors of interest, e.g., located at gate 11 and 12 of LAX terminal 1, out of the twenty four sensors are displayed. It is appreciated that the zooming in/out may also be achieved by manipulating the location pane 406 window, e.g., by selecting LAX terminal 1 all sensors in terminal 1 would be displayed in the map pane 404. It is appreciated that in this embodiment, the user may be interested in sensors of gate 11. As such, gate 11 may be selected by selecting it in the location pane 406 and/or by selecting it in the map pane 404. It is appreciated that user selection of gate 11 may be through any other means, e.g., hovering the pointing device over the group of sensors of interest.

The selection of the gate of interest, e.g., gate 11, may result in the playback device 382 to be displayed rendering the sensor readings over the time of interest. In this embodiment, measured values from sensors S1-S3 are displayed. The playback device 382 may be used in a similar fashion as described in FIGS. 3A-3C. For example, the playback device 382 may be used in order to scroll through the measured values over time, e.g., play, fast forward, rewind, etc.

Referring now to FIG. 4C, further zooming in on sensors of gate 11 may display the geo-locational positions of sensors S1-S3 with respect to one another on the map in the map pane 404. It is appreciated that zooming in/out may be through the zooming device 402 or via the location pane 406, among other options. In this embodiment, selection of the sensor of interest, e.g., S3, via the map pane 404 or the location pane 406 may cause the playback device 382 to render sensor readings for the selected sensor. In other words, while in FIG. 4B all three sensors of gate 11 were displayed in the playback device 382, in FIG. 4C, user selection of sensor S3 may cause the playback device 382 to render sensor readings associated with the selected sensor. It is appreciated that sensor selection may be through selection of the sensor in the map pane 404 by selecting or hovering over S3, through the location pane 406 by selecting sensor 3 in gate 11, or by selecting the graph of sensor readings associated with sensor 3 from the playback device 382 in FIG. 4B, to name a few.

It is appreciated that selection of a given sensor may provide additional information associated with the selected sensor. For example, selecting sensor 3 in gate 11 may provide information associated with that sensor, e.g., configuration state of the sensor, last reset, duration of the state (e.g., duration of elevated state, duration of critical state, duration of normal state, etc.), name of the sensor, sensor type (e.g., sensor types as discussed in FIG. 1), closest sensor within its proximity, closest visual capturing device, longitudinal and latitudinal information of the sensor, GPS location of the sensor, metadata associated with the sensor, etc.

Figure 5A:
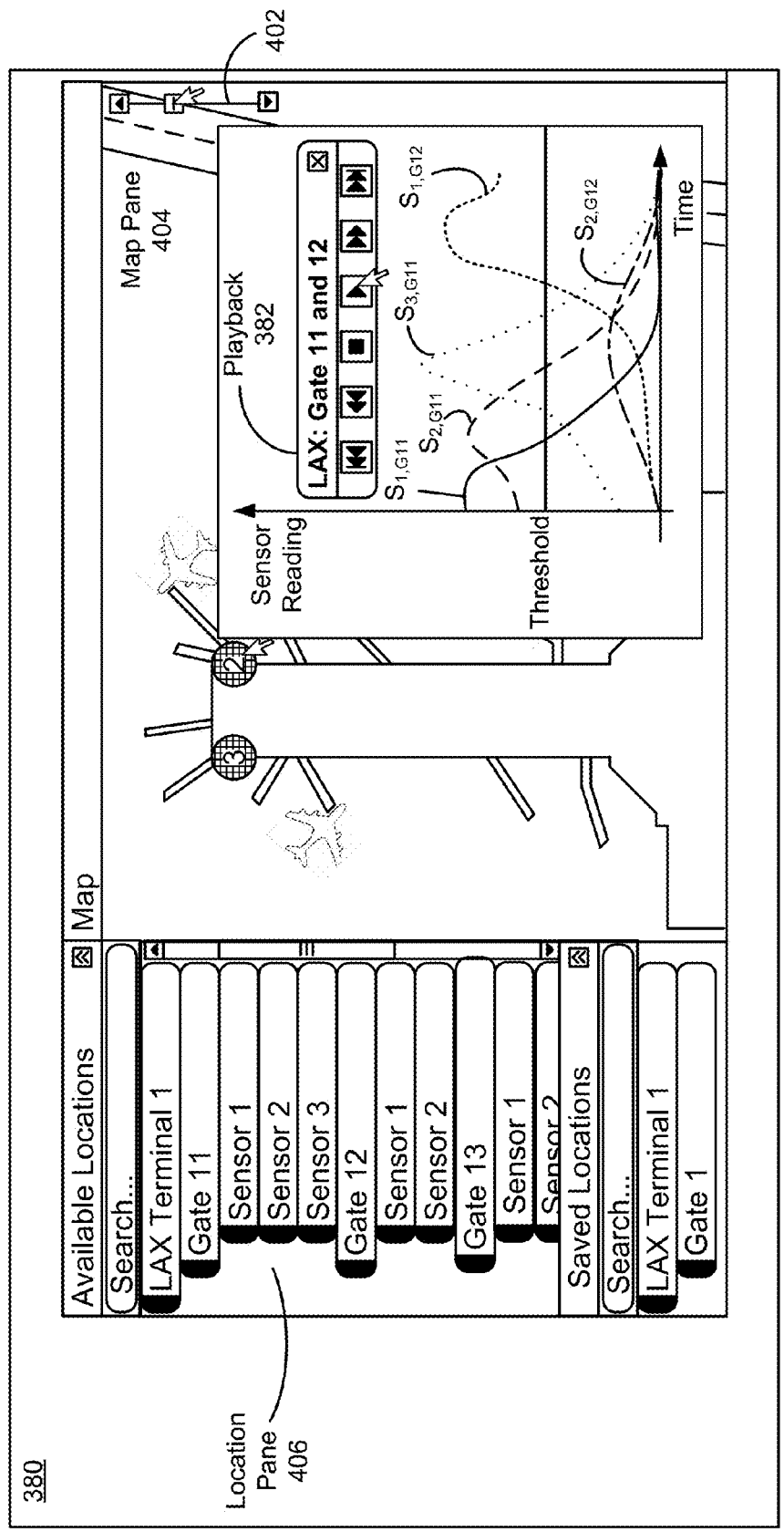
FIGS. 5A-5B show another sensor based playback graphical user interface in accordance with some embodiments.
Figure 5B:
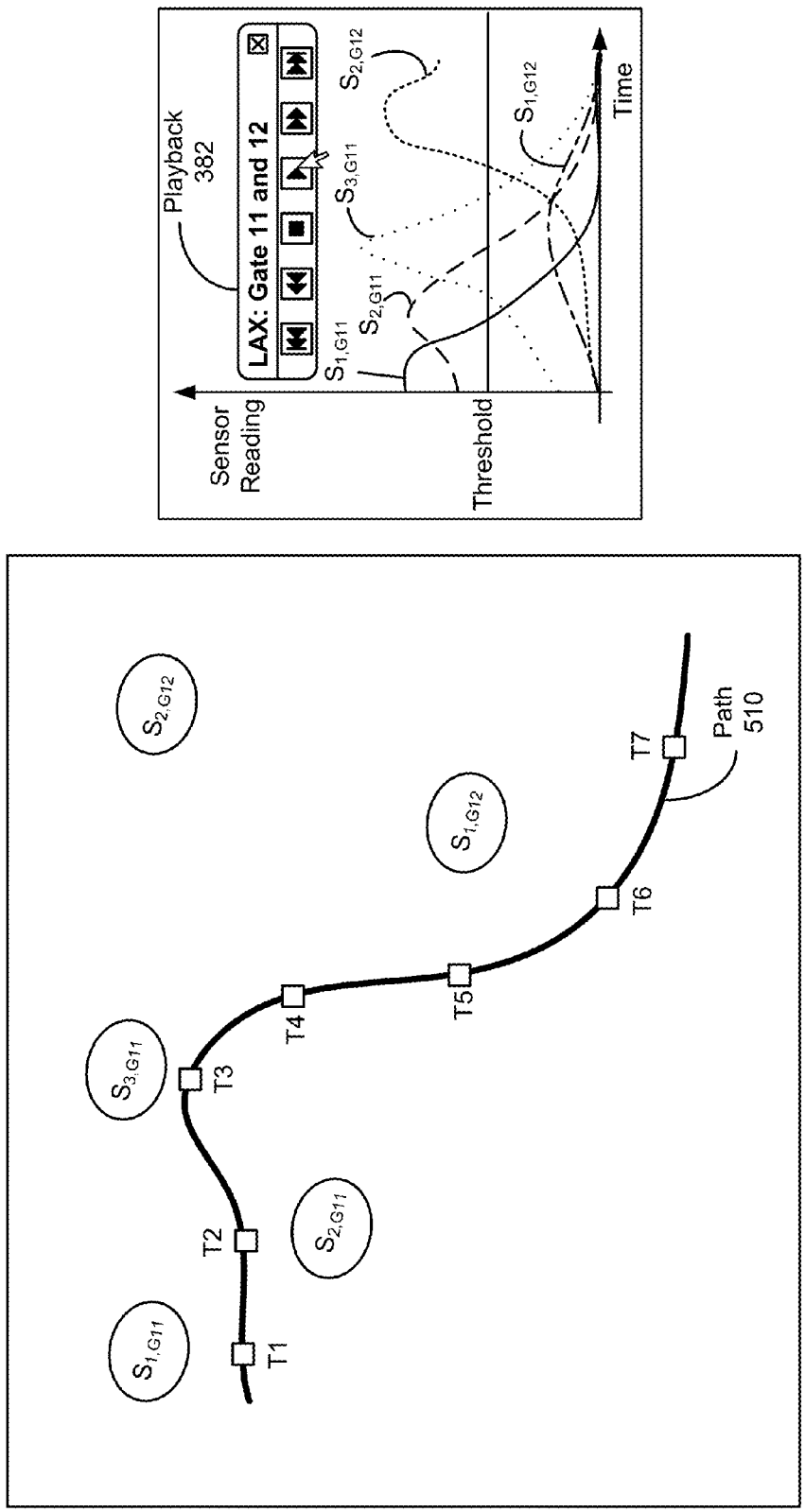

Referring now to FIGS. 5A-5B, another sensor based playback graphical user interface in accordance with some embodiments is shown. FIG. 5A is similar to that of FIG. 4B. However, in FIG. 5A, the sensors of interest are at gate 11 and gate 12 at terminal 1 of LAX. In this illustrative embodiment, the playback device 382 renders the sensor readings for each gate over the time interval of interest. For example, $S_{1,G11}$ is the measured reading for sensor 1 at gate 11, $S_{2,G11}$ is the measured reading for sensor 2 at gate 11, $S_{3,G11}$ is the measured reading for sensor 3 at gate 11, $S_{1,G12}$ is the measured reading for sensor 1 at gate 12, and $S_{2,G12}$ is the measured reading for sensor 2 at gate 12, that are displayed by the playback device 382. It is appreciated that the playback device 382 may be manipulated by the user in the similar fashion as described above to provide insight to the user that otherwise would go unnoticed.

Referring now to FIG. 5B, a path travelled by a hazardous material may be displayed based on the playback device 382 and the measured sensor readings. In this illustrative embodiment, $S_{1,G11}$ shows an elevated reading at time T1. However, measured reading of $S_{1,G11}$ decreases at time T2, however, at time T2, measured reading of $S_{2,G11}$ shows an elevated reading. Measured readings at time T3 further decreases for $S_{1,G11}$ and $S_{2,G11}$ while increases for $S_{3,G11}$. The measured sensor readings for sensors of gate 11 all decrease over times T4-T7, while readings for sensors $S_{1,G12}$ and $S_{2,G12}$ increase over that time before it drops off. As such, the path travelled by hazardous material may be rendered for visual representation of the event that may have occurred. It is appreciated that the path travelled by hazardous material, e.g., via radiation detection, is exemplary and not intended to limit the scope of the embodiments. For example, similar process may be employed to detect dangerous temperatures at a manufacturing facility at different machinery of an assembly line that may imply a possible defect or hazard associated with a given batch of manufacturing product.

Figure 6:
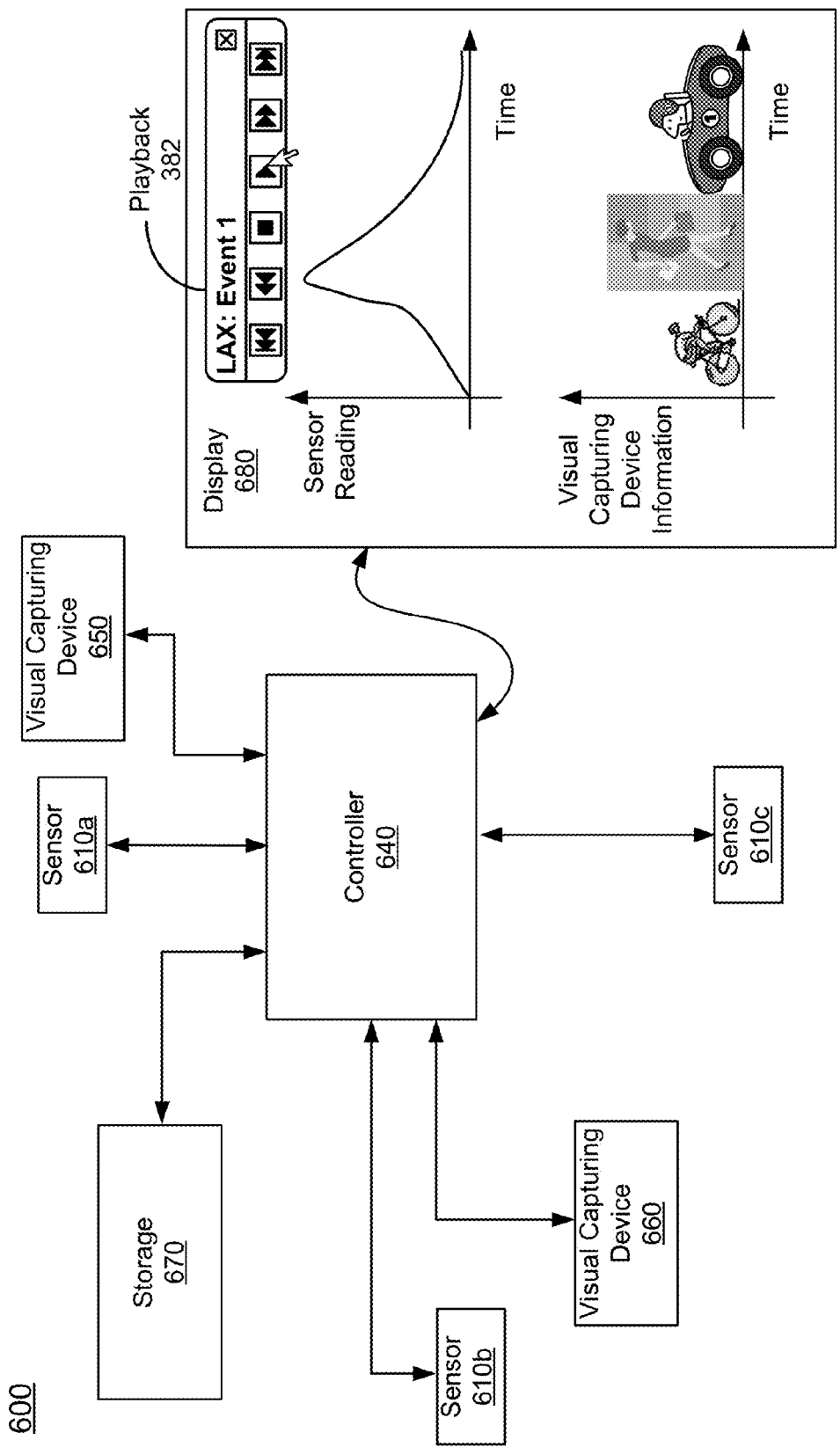
FIG. 6 shows a sensor based playback system and a display capturing according to some embodiments.

Referring now to FIG. 6, a sensor based playback system and a display capturing according to some embodiments is shown. System 600 includes sensors 610a-610c that operate substantially similar to that of sensors 310a-310e, a controller 640 that operates substantially similar to that of controller 340, a storage 670 that operates substantially similar to that of storage 370, a display device 680 that operates substantially similar to that of display device 380, and a visual capturing devices 650 and 660.

It is appreciated that the visual capturing device 650 and 660 may be similar to the visual capturing device 205 described above. For example, the visual capturing device 650 and 660 may include a video camera, a digital camera, a surveillance camera, a smartphone, a still camera, an infrared camera, etc. The visual capturing device 650 and 660 may capture information that is complementary to the measured values of the sensors.

According to one embodiment, the captured visual information by the visual capturing device 650 and 660 may be displayed. For example, in the illustrative embodiment described herein, the display device 680 may render the captured information by the visual capturing device 650 that is associated with sensor 610a. It is appreciated that the association of the visual capturing device with one or more sensors is discussed in subsequent figures.

In this illustrative embodiment, the captured surveillance footage displayed along with the measured sensor may enable one to conclude that a spike in the measured value may be due to the woman passing in close proximity of the sensor 610*a*. As such, possible terrorist attacks may be circumvented or detected for punitive measures. It is appreciated that the playback device 382 may be used to scroll through events in time for both the sensor readings and for the captured visual information. For example, fast forwarding using the playback device 382 fast forwards the measured readings for sensor and also fast forwards the surveillance footage associated therewith.

According to some embodiments, the captured visual information associated with the visual capturing devices 650 and 660 is time stamped automatically. In some embodiments, the captured visual information by the visual capturing devices 650 and 660 may be time stamped based on a user selection to time stamp the captured visual information. According to some embodiments, the captured visual information may be time stamped based on heuristics. For example, the captured visual information may be time stamped in response to the sensor(s) meeting a certain criteria, e.g., being above a threshold, being within a certain range, sensors having a similar increase/decrease in measurement within a certain amount of time from one another, sensors of different type satisfying different set of criteria within a certain amount of time, etc. The time stamped captured visual information may be subsequently stored in the storage component 670 for later retrieval, e.g., for simultaneously rendering the surveillance footage along with rendition of sensor(s) reading on the playback device 382. In other words, certain conditions, e.g., sensor(s) readings satisfying a certain condition, may trigger the captured visual information to be time stamped and stored for future use.

Figure 7A:
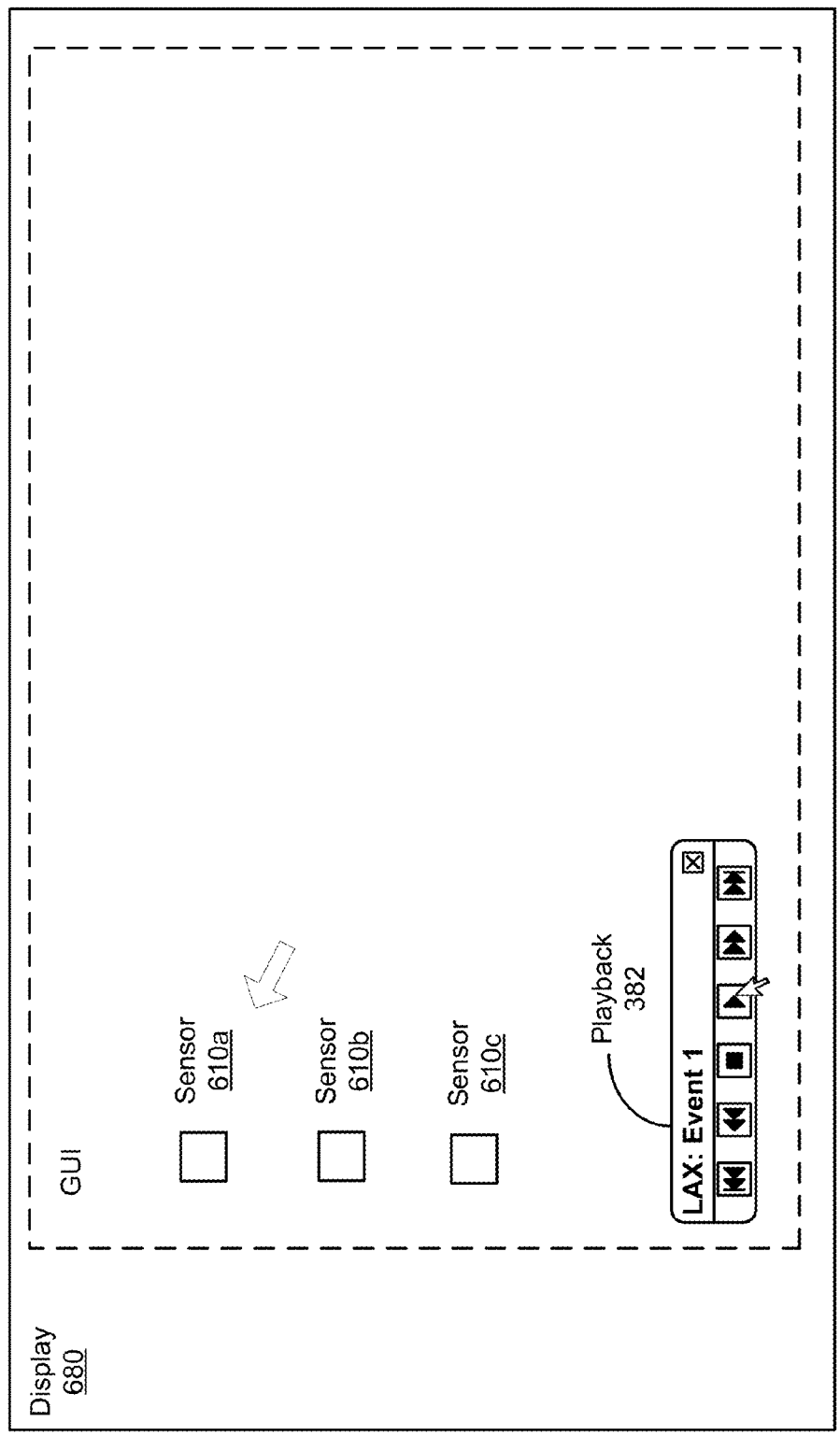
FIGS. 7A-7D show rendering of sensor readings and visual capturing device in a sensor based system in accordance with some embodiments.
Figure 7B:
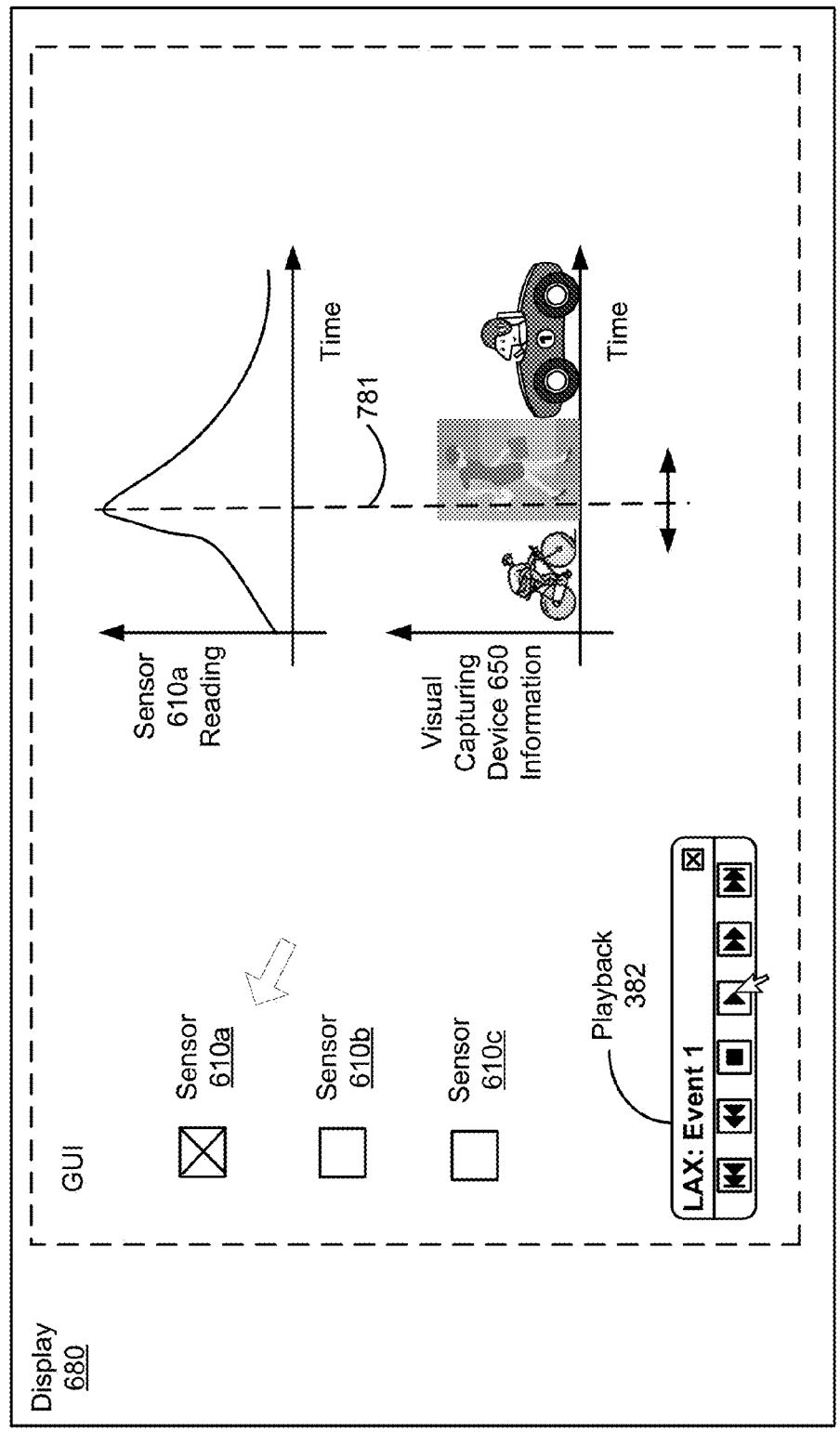

Referring now to FIGS. 7A-7D, rendering of sensor readings and visual capturing device in a sensor based system in accordance with some embodiments is shown. The display device 680 may render the playback device 382 and various selectable sensors, e.g., sensors 610*a*-610*c*. Referring now to FIG. 7B, user selection of sensor 610*a* is shown. In this illustrative embodiment, user selection of sensor 610*a* causes sensor readings associated with sensor 610*a* to be displayed along with the captured visual information associated with visual capturing device 650. In this illustrative embodiment, the visual capturing device 650 is associated with sensor 610*a* based on heuristics.

The playback device 382 may optionally be rendered to enable the user to scroll through events, e.g., sensor 610*a* readings and captured visual information by visual capturing device 650, in a certain time period. For example, the user may select to play the event by selecting a play button on the playback device 382. Furthermore, the user may select to fast forward, rewind, etc., by manipulating the playback device 382. In some embodiments, an interactive moving window 781 may optionally be rendered to enable the user to scroll through events in time, e.g., by moving the window 781 to the left the user can scroll back in time and by moving the window 781 to the right the user can scroll forward in time, etc.

It is appreciated that the time period for rendering the sensor reading and the captured visual information may be user selected, e.g., user may select to display events (sensor readings and captured visual information) from the past one hour, past one month, past one year, from a year ago to six months ago, etc. It is appreciated that period of time may be set by default based on heuristics in some embodiments. Selection of the time period may be similar to that of FIG. 3A-4C described above.

Figure 7C:
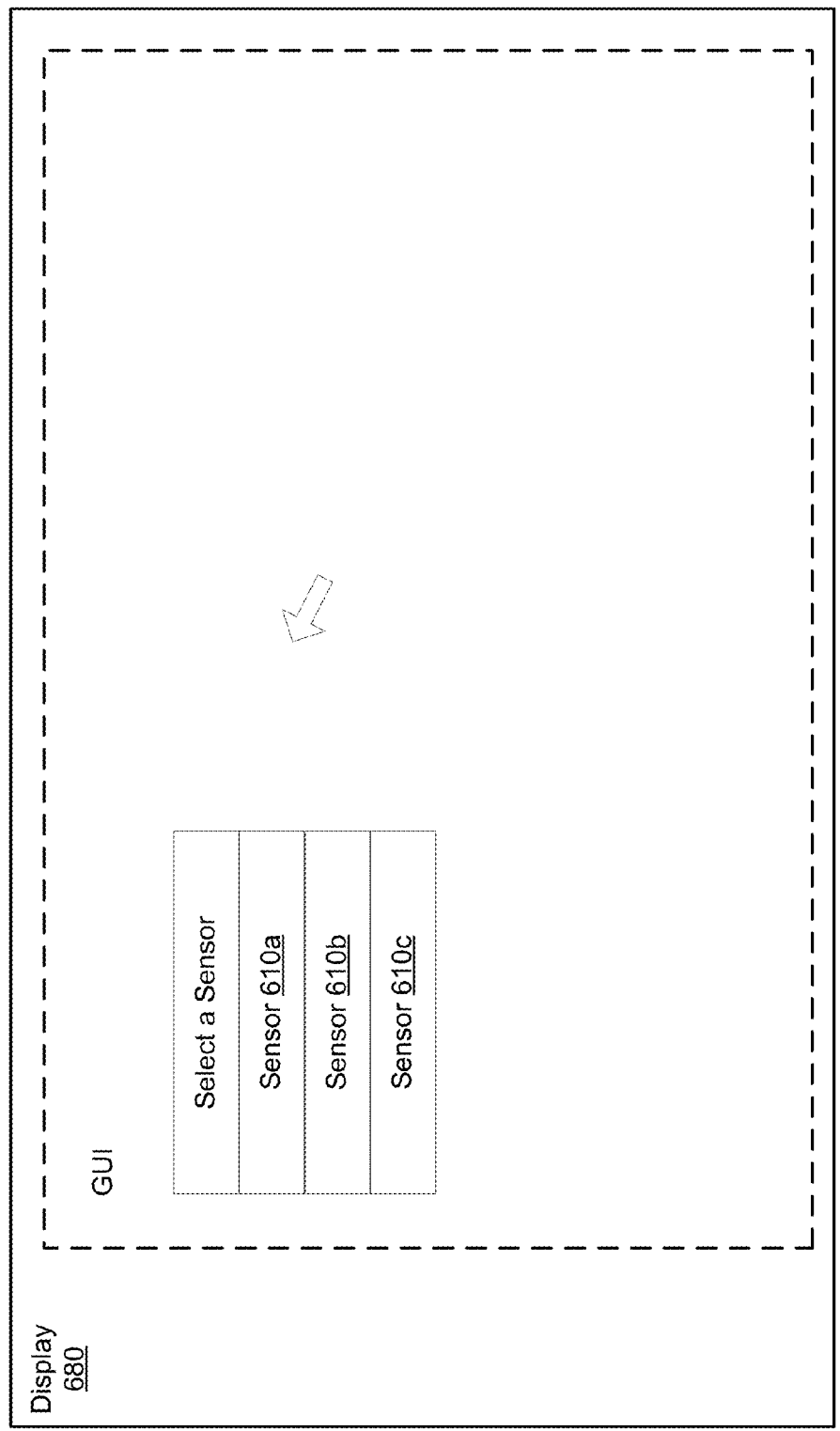
Figure 7D:
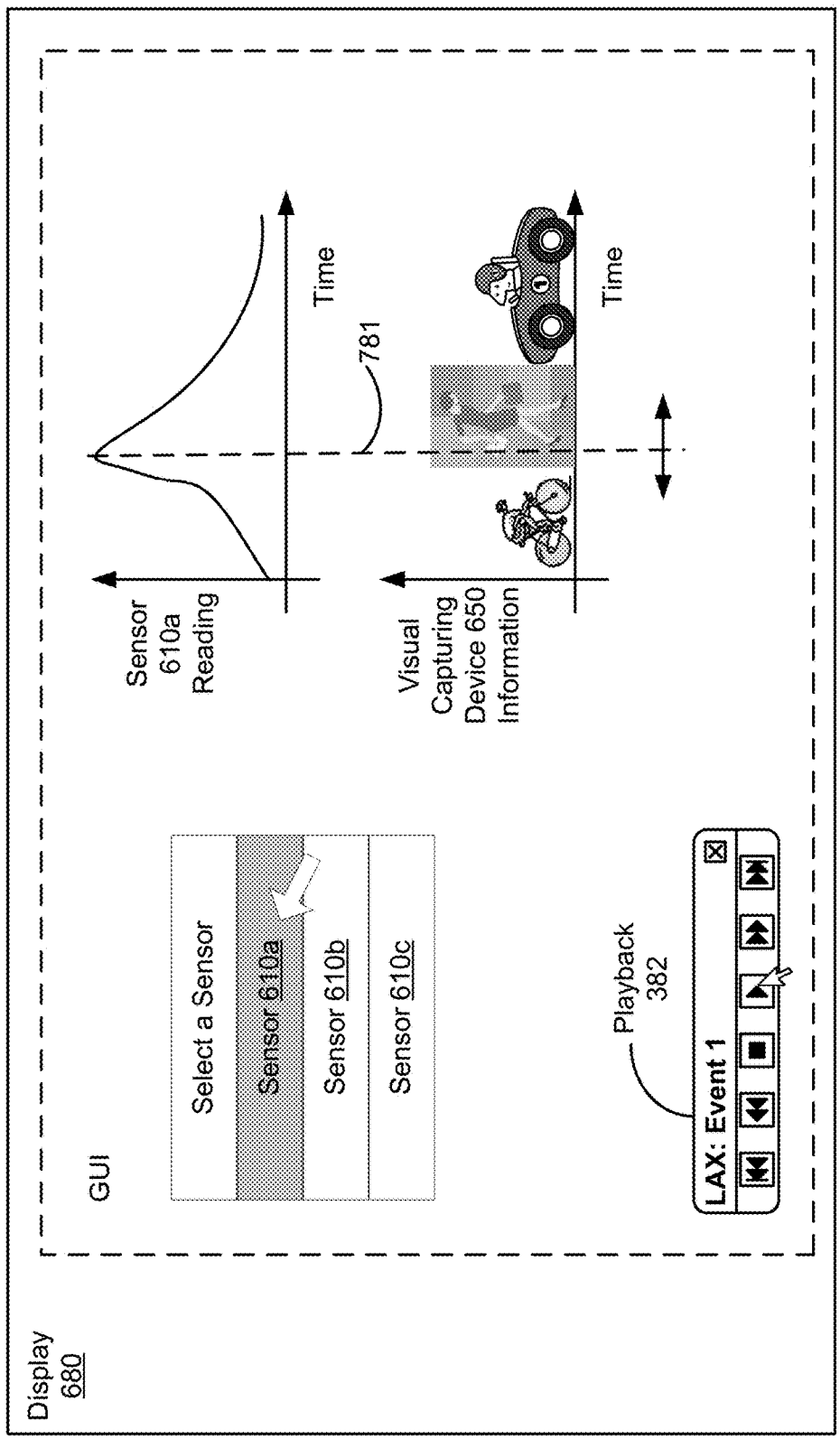

Referring not to FIG. 7C, another embodiment by which a sensor can be selected is shown. In this illustrative embodiment, a dropdown menu is presented for user selection thereof. In response to user selection of a sensor, e.g., sensor 610*a*, from the dropdown menu, the captured information, e.g., sensor readings and captured visual information of the visual capturing device, are rendered on the display device 380 as a GUI, as shown in FIG. 7D. It is appreciated that in some embodiments, the playback device 382 may optionally be rendered to enable the user to manipulate scrolling through events in time. In some embodiments, an interactive moving window 781 may optionally be rendered to enable the user to scroll through events in time, e.g., by moving the window 781 to the left the user can scroll back in time and by moving the window 781 to the right the user can scroll forward in time, etc.

In some illustrative embodiments, the sensor(s) may be associated with one or more visual capturing device(s) based on a user selection. In some embodiments, the sensor(s) may be associated with one or more visual capturing device(s) based on heuristics. For example, sensor(s) may be associated with a visual capturing device based on various criteria, e.g., being within a certain proximity, being within a same structure such as a building, being within a same room, being within the line of sight of one another, being within a similar geo-locational position, being within a similar GPS coordinates, being within a certain distance and/or radius of one another, being associated with a same structure such as exterior and interior of the same building or device, sharing similar latitudinal position, sharing similar longitudinal position, etc.

Figure 8B:
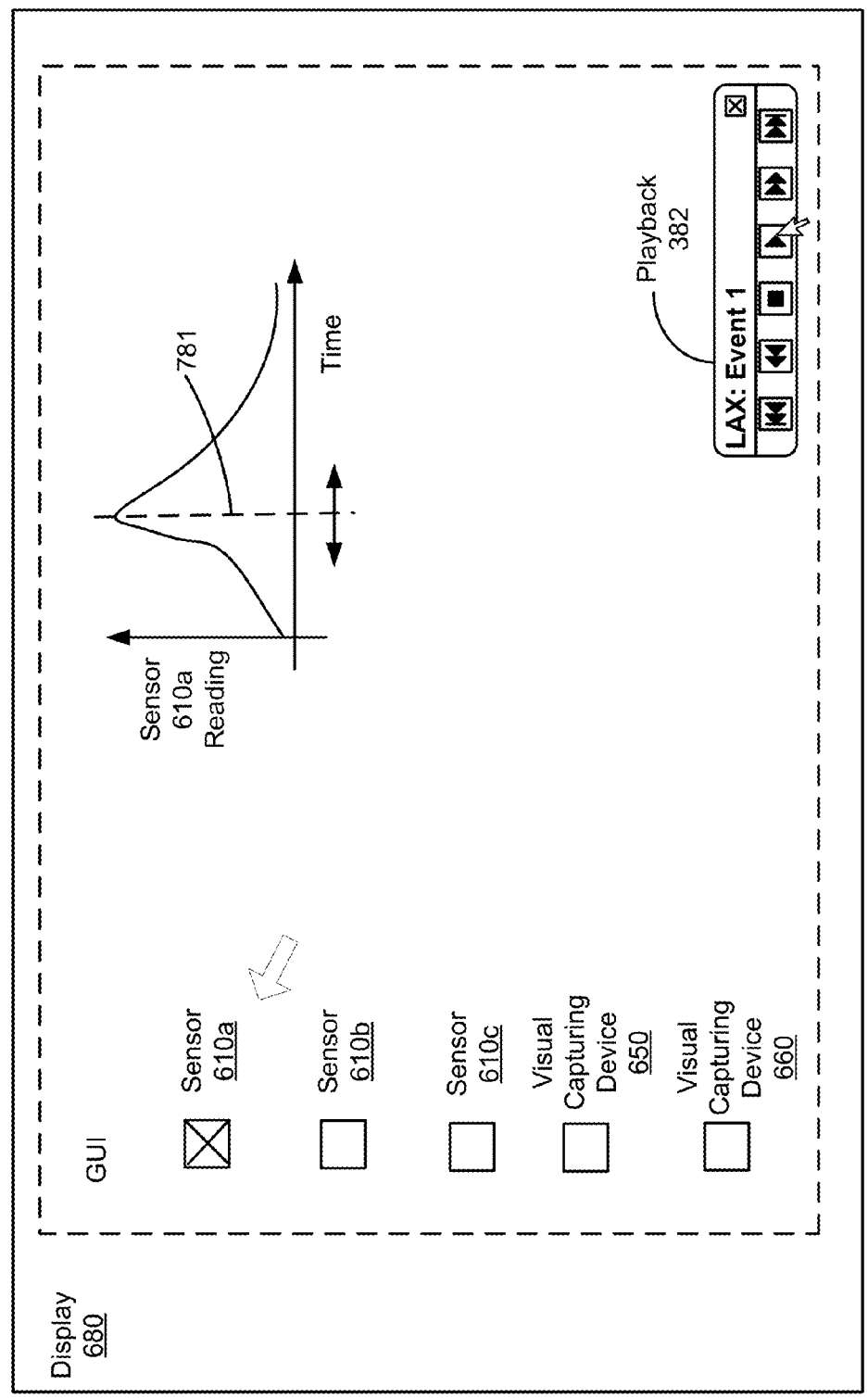
Figure 8C:
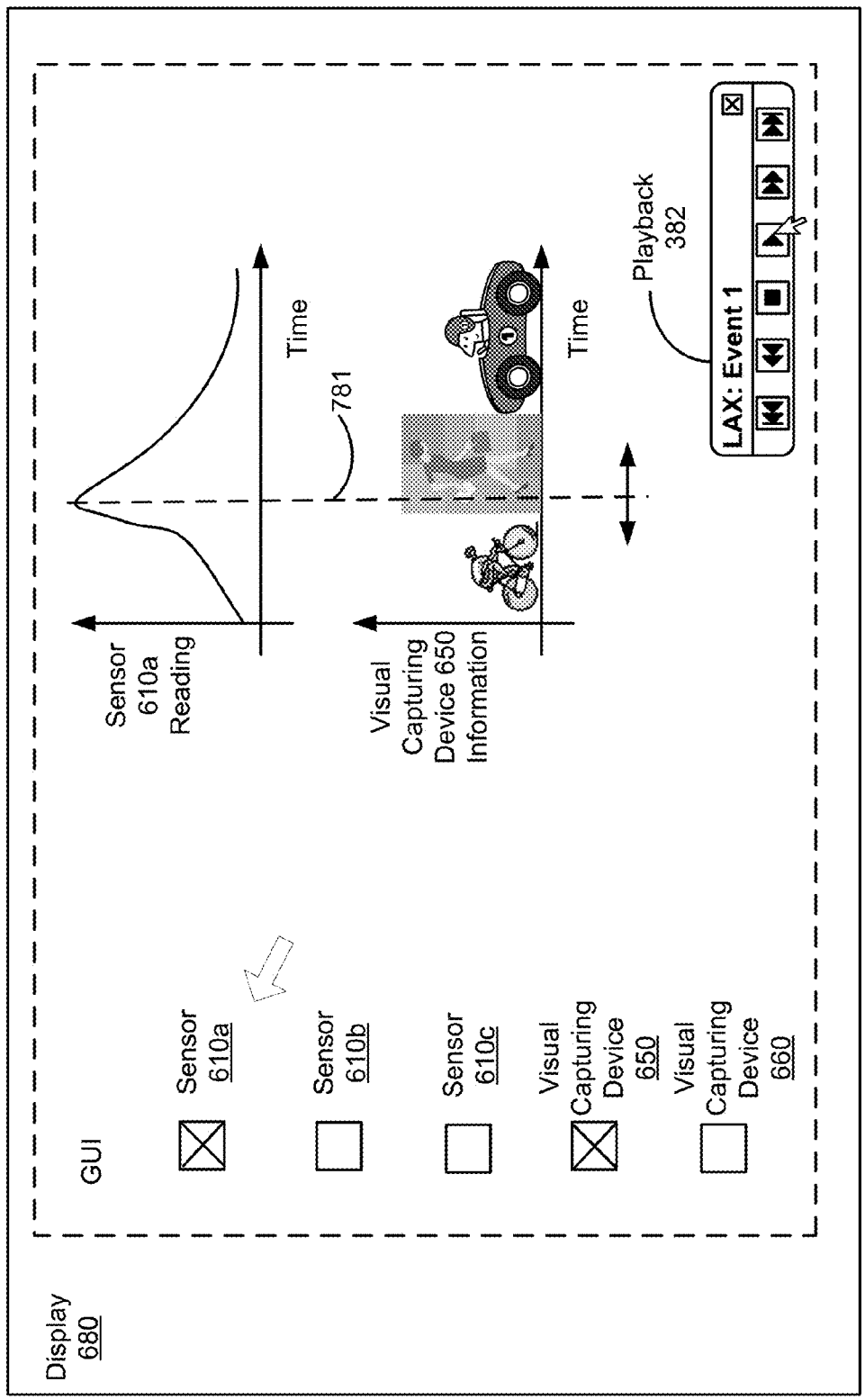

Referring now to FIGS. 8A-8C, rendering of another sensor(s) readings and visual capturing device in a sensor based system in accordance with some embodiments is shown. In one illustrative embodiment, sensor(s) and the visual capturing device(s) may be selected by the user, the selection of which may be independent from one another. In other words, the user may group the sensor(s) and the visual capturing device(s) as desired. Referring now to FIG. 8B, user selection of sensor 610*a* is shown. In this embodiment, the selection of the sensor 610*a* causes the reading of the sensor 610*a* to be displayed for a certain time period, e.g., user selected time period, default period, etc., as described above. It is appreciated that the sensor readings may be displayed on the GUI optionally with the playback device 382 and/or the interactive moving window 781 for user manipulation thereof.

Referring now to FIG. 8C, user selection of the visual capturing device 650 in accordance with some embodiments is shown. In this embodiment, the selection of the visual capturing device 650 causes the captured visual information to be rendered on the GUI. Similar to above, the rendered captured visual information may be manipulated using the playback device 382 and/or the interactive moving window 781.

Figure 9B:
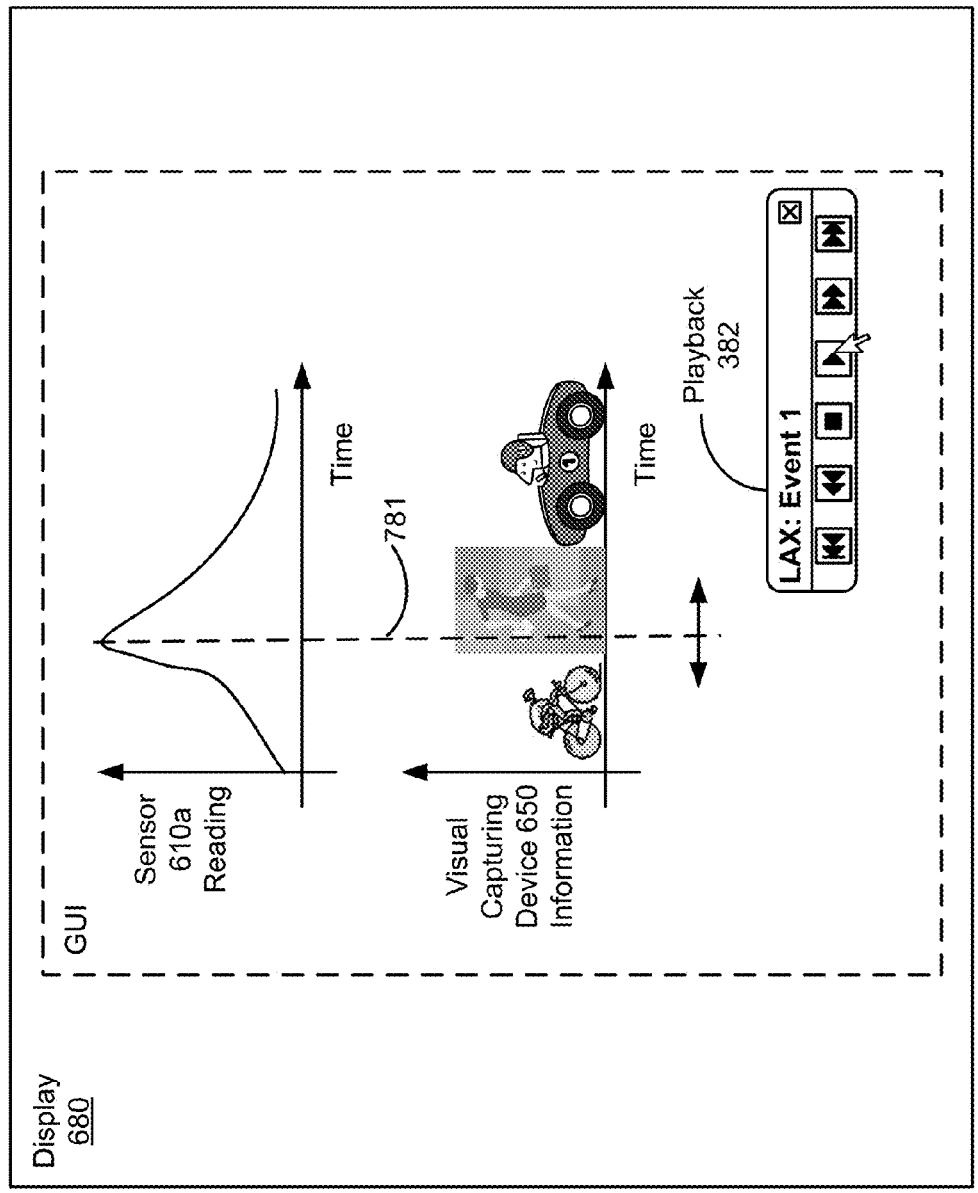

Referring now to FIGS. 9A-9D, selection and display of sensors and their associated visual capturing devices in a sensor based system in accordance with some embodiments is shown. Referring specifically to FIG. 9A, the display device 680 rendering a GUI to enable the user to select sensor(s) and visual capturing device(s) independently, or automatic selection of sensor(s) and visual capturing device (s) automatically is shown. In some embodiments, information associated with all sensor(s) and the visual capturing device(s) or a subset thereof may be displayed. In this embodiment, information regarding location, name, media access control (MAC) address, description latitude, longitude, and IP address of sensor(s) and visual capturing device(s) may be displayed.

In this embodiment, the user may select to individually and independently select sensor(s), e.g., sensor 610a, and visual capturing device(s), e.g., visual capturing device 650. The result of the user selection may be displayed in FIG. 9B in a similar fashion as FIGS. 8B and 8C.

Figure 9C:
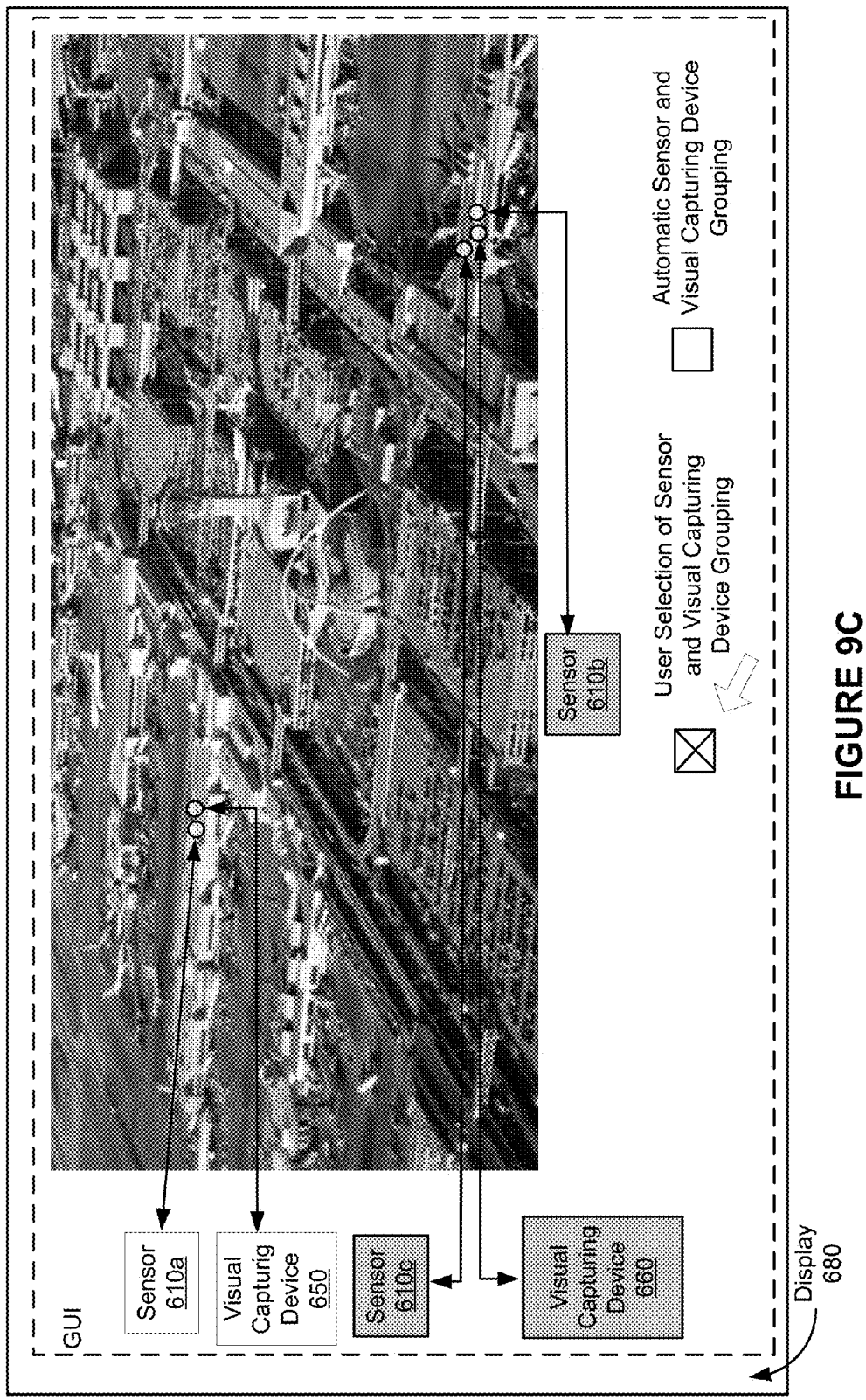

Referring now to FIG. 9C, the GUI of the display device 680 may render the sensor(s), e.g., sensors 610a-640c, and the visual capturing device(s), e.g., visual capturing devices 650-660, for user selection thereof along with their representation at their appropriate location on a map. It is appreciated that the representation of the sensor(s) and the visual capturing device(s) on the map may be based on their actual physical location. In this embodiment, the map is the map of LAX airport with sensor(s) and visual capturing device(s) positioned on the map that represent the actual sensor(s) and visual capturing device(s).

Figure 9D:
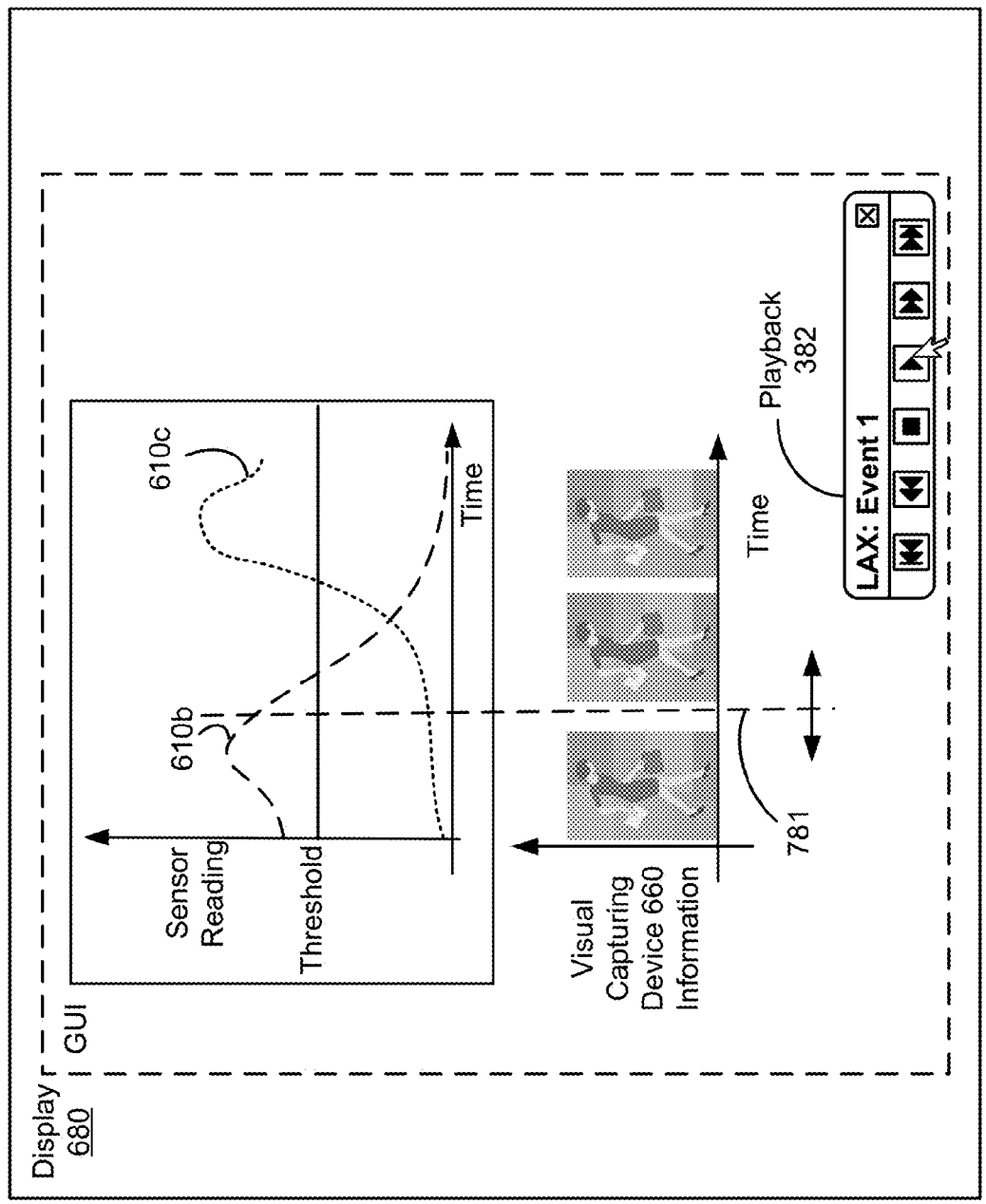

According to some embodiments, the user may select the sensor(s) and the visual capturing device(s) as desired. In other words, the user may group the sensors and the visual capturing devices as desired. In this illustrative embodiment, the user has selected sensors 610b and 610c along with the visual capturing device 660. Thus, sensors 610b-c and the visual capturing device 660 may be grouped together and their information may be rendered on the GUI, as shown in FIG. 9D. It is appreciated that the user may scroll through events, measurements, and time by manipulating the playback device 382 and/or the interactive moving window 781.

In this embodiment, displaying measurements by sensors 610b and 610c along with the captured visual information by the visual capturing device 660 may provide certain queues to the user. In other words, the visual capturing device 660 may provide valuable visual queues to complement measurement information by the sensors. For example, the user may observe that a female individual has been walking between sensors 610b and 610c as visually captured by the visual capturing device 660. Combining the visual queues along with the sensor(s) readings may provide clues for elevated measurement readings for the sensors, e.g., indicating that the female individual was the cause of elevated reading, therefore perhaps carrying bio-hazardous material. As such, appropriate action may be taken, e.g., notifying the appropriate personnel such as police, locking down the facility, sending a tweet to public to report seeing the female suspect, etc.

Figure 10A:
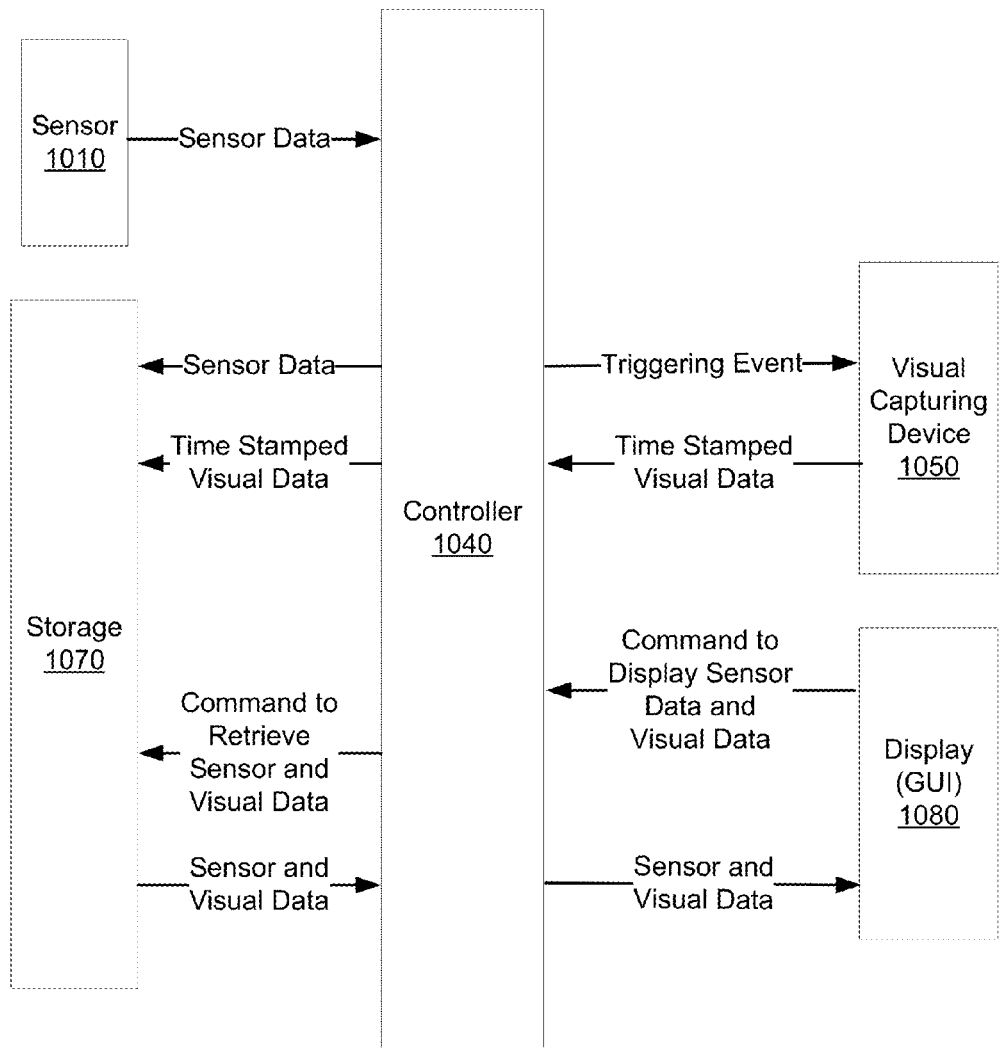
FIGS. 10A-10B show data communication flow according to some embodiments.
Figure 10B:
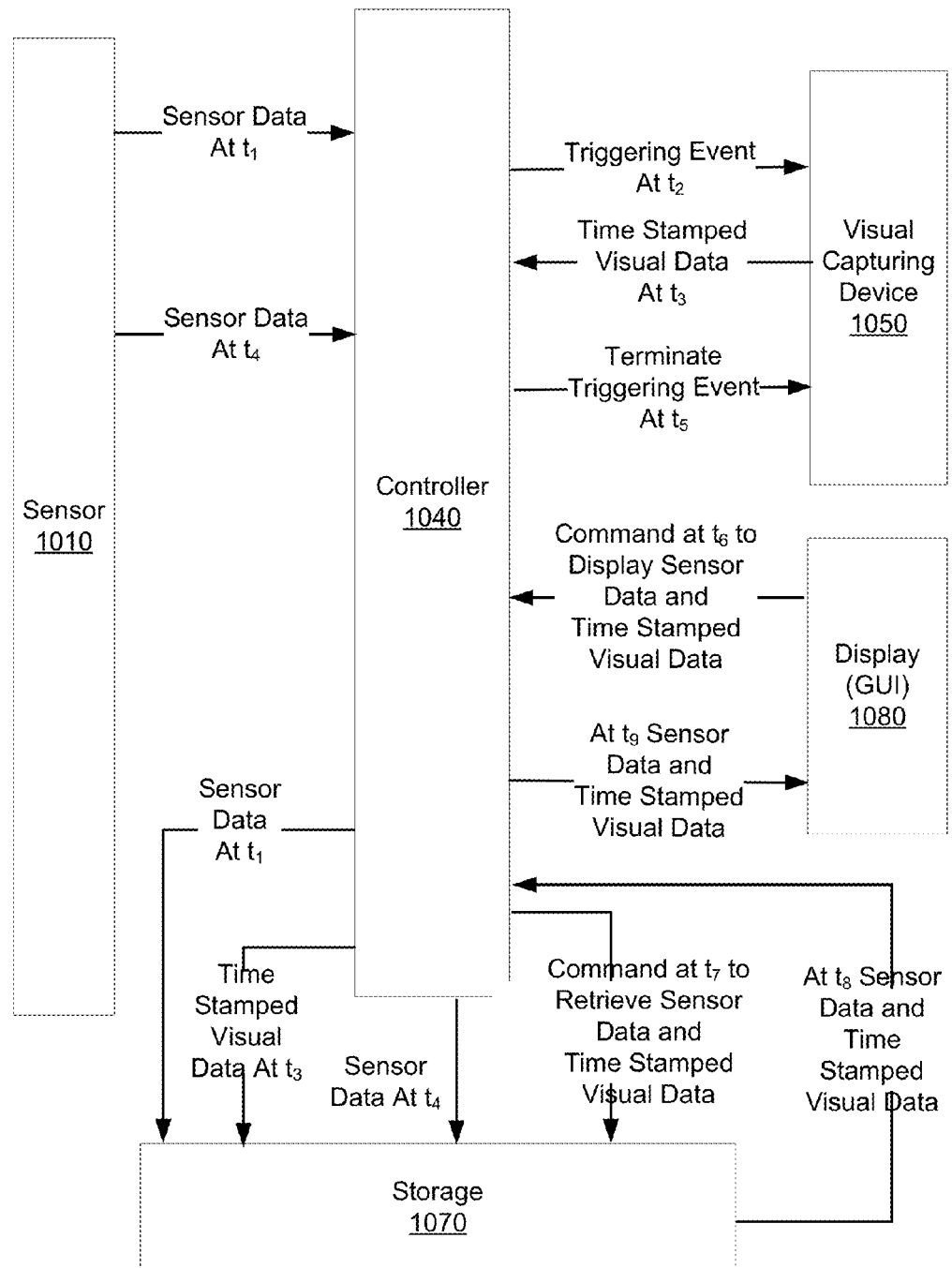

Referring now to FIGS. 10A-10B, data communication flow according to some embodiments is shown. Referring specifically to FIG. 10A, sensor 1010 transmits sensor data, e.g., measured from its input, to the controller 1040. The controller 1040 may process the received sensor data. In one embodiment, the controller 1040 may determine that the sensor data and/or data derived therefrom is to be stored in the storage component 1070 and is transmitted for storage thereof. In some embodiments, the controller 1040 may determine whether a triggering event has occurred, e.g., certain measurement reading, certain measurement reading by a group of sensors, certain measurement reading by a group of sensors within a certain period of time, etc. The controller 1040 may trigger a signal in response to determining that the triggering event has occurred. The triggering event is transmitted to the visual capturing device 1050, in one embodiment. As such, the visual capturing device 1050 may transmit captured visual information to the controller 1040. The transmitted captured visual information may be time stamped by the visual capturing device 1050 and/or the controller 1040. The captured visual information may subsequently be stored in the storage component 1070.

According to some embodiments, a command to display sensor data (or derived data) and/or visual data may be received by the controller 1040 from the display device and its GUI 1080. The command may be transmitted to the storage component 1070 to retrieve the relevant information. The storage component 1070 may therefore retrieve and transmit the requested information to the controller 1040 which further causes that information to be rendered on the display (GUI) 1080 for user manipulation thereof.

Referring now to FIG. 10B, data communication flow according to some embodiments is shown. According to some embodiments, at time $t_1$ sensor data is transmitted from sensor 1010 to the controller 1040. The controller 1040 process the received information similar to FIG. 10A. The processed and/or the raw information received may be stored at storage 1070 at time $t_1$ as they are received from the sensor 1010 or shortly after. The controller 1040, at time $t_2$, may determine whether a triggering event has occurred. If the controller 1040 determines that the triggering event has occurred, it may transmit a signal to the visual capturing device 1050 at $t_2$ to capture visual information and to time stamp the captured visual information. The time stamped visual data may be transmitted at time $t_3$ from the visual capturing device 1050 to the controller 1040 and stored in the storage component 1070 (either directly without going through controller 1040 (not shown) or by going through the controller (1040)) at time $t_3$ or shortly after.

At time $t_4$, additional sensor data is received from the sensor 1040 by the controller 1040. The received information or processed and derived information therefrom may be stored in the storage component 1070 at time $t_4$ or shortly after. The controller 1040 may determine whether a terminating triggering event has occurred. The terminating triggering event may be based on whether one or more sensor(s) satisfy a certain condition(s), e.g., certain measurement reading, certain measurement reading by a group of sensors, certain measurement reading by a group of sensors within a certain period of time, etc. The controller may transmit a signal to terminate triggering event to the visual capturing device 1050 at time $t_5$. In other words, logging of visual captured information and storage therefrom may be terminated.

In some embodiments, a command may to display sensor data (or derived data therefrom) and/or time stamped visual data may be received by the controller 1040 from the display (GUI) 1080, at time $t_6$. The received command may cause the controller 1040 to send a command to retrieve sensor data (or data derived therefrom) and/or the captured visual data for a certain time period, e.g., data time stamped between time $t_2$ and $t_5$, from the storage component 1070. As such, the storage component 1070 may transmit the information to the controller 1040 or directly to the display (GUI) 1080 (not shown). In this embodiment, the controller 1040 receives and relays the information to the display (GUI) 1080 at time $t_9$. Accordingly, the user may view the measured sensor(s) information and/or the visually captured information for the time period of interest, e.g., between time $t_2$ and $t_5$.

Figure 11A:
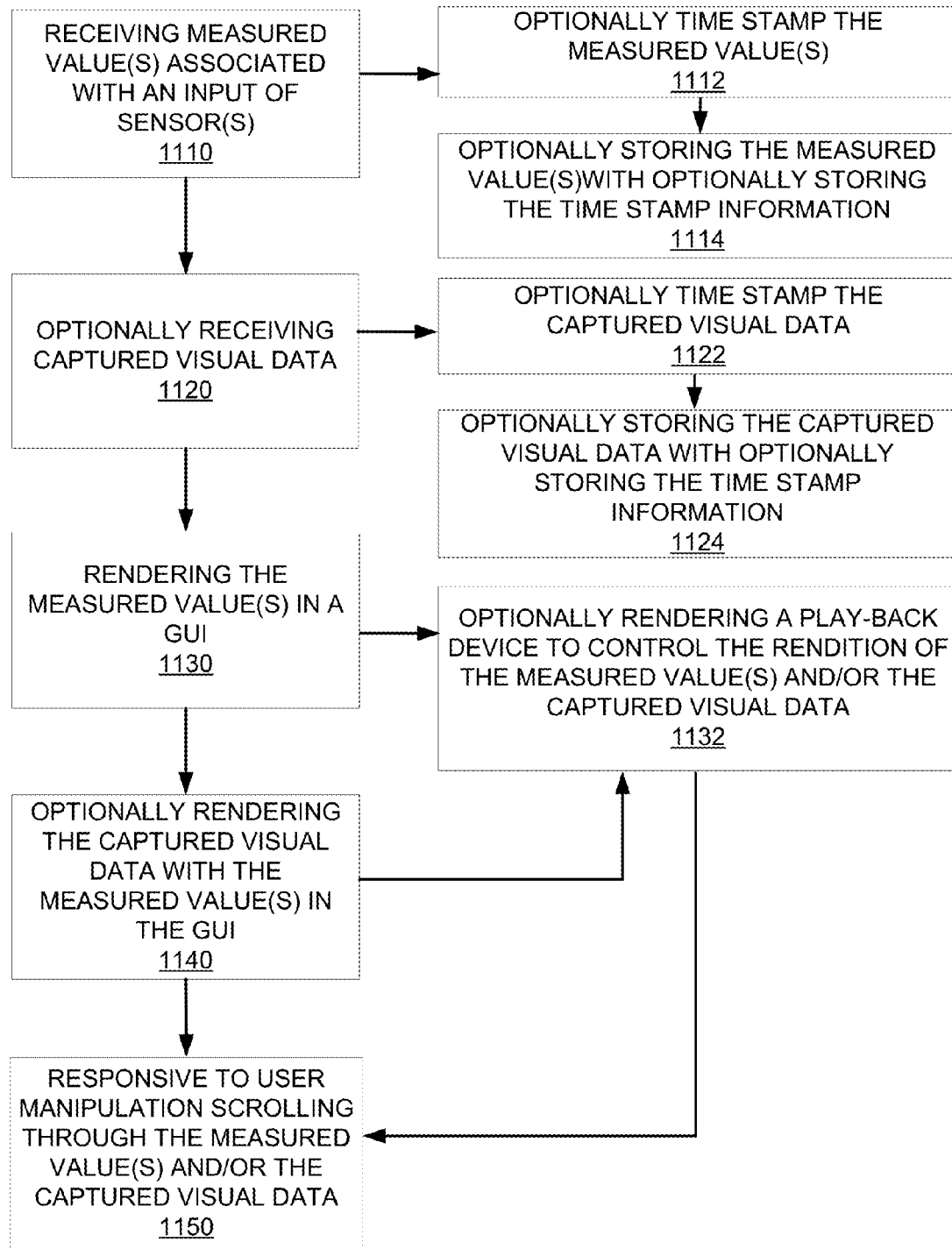
FIG. 11A-11B shows a flow diagram according to some embodiments.
Figure 11B:
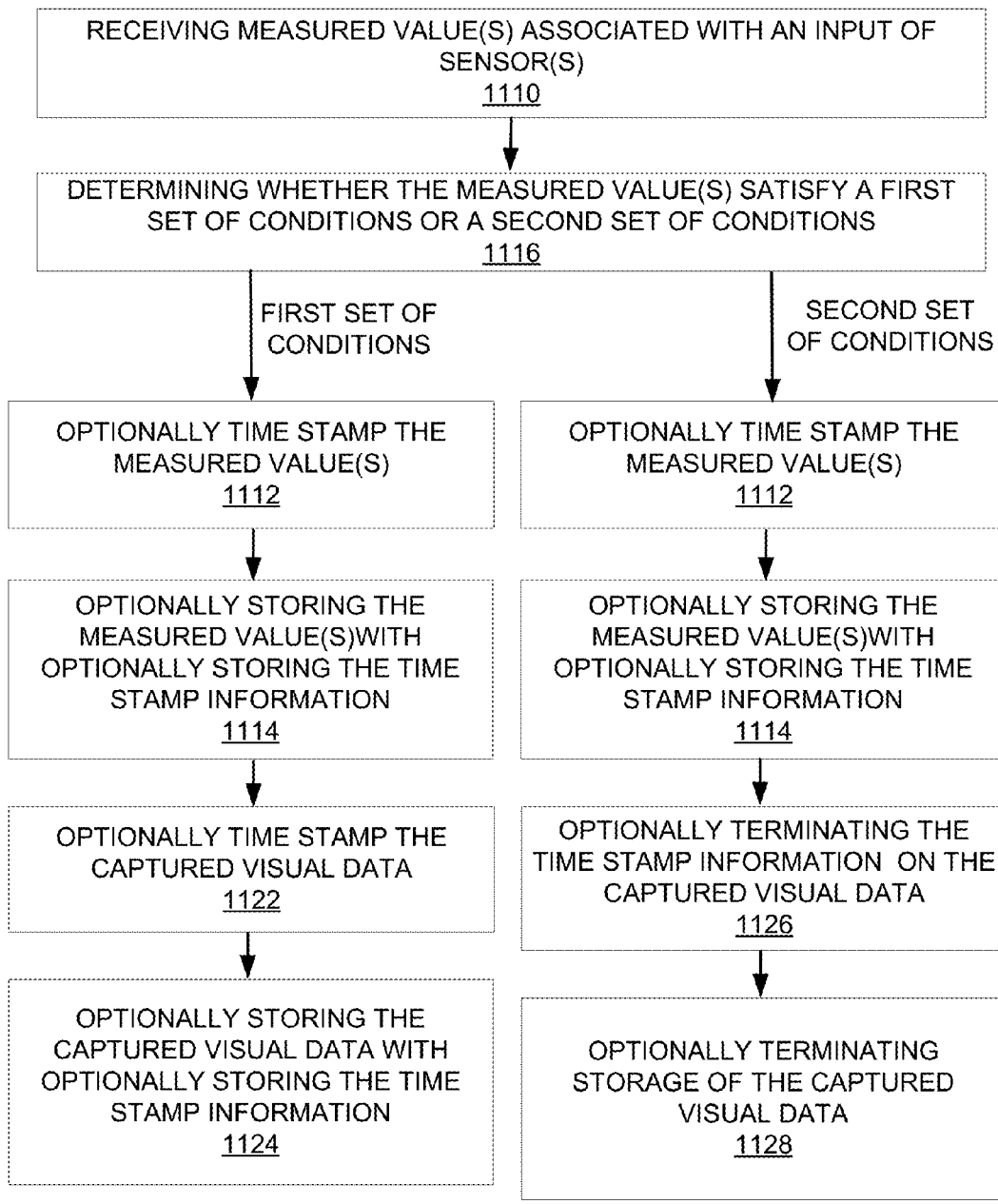

Referring now to FIGS. 11A and 11B, flow diagrams according to some embodiments are shown. Flow diagrams 11A and 11B describe various processes that were described in FIGS. 1A-10B.

At step 1110, measured value(s) associated with an input of sensor(s) is received. Optionally at step 1112, the measured value(s) may be time stamped. Furthermore, optionally at step 1114, the measure value(s) (with or without their timestamp) may be stored for later retrieval.

At step, 1120, captured visual data may be optionally received. Optionally at step 1122, the captured visual data may be time stamped and optionally at step 1124 the captured visual data (with or without the time tamp information) may be stored for later retrieval.

At step 1130, the measured value(s) may be rendered on a GUI. Optionally, the captured visual data may also be rendered on the GUI, at step 1140. Optionally at step 1132, a playback device may be rendered to allow a user to control the rendition of the measured value(s) and/or the captured visual data. At step 1150, responsive to user manipulation, the GUI renders the measured value(s) and/or the captured visual data that can be scrolled through in time.

Referring now to FIG. 11B, at step 1110, measured value(s) associated with an input of sensor(s) is received. At step 1116, it is determined whether the measured value(s) satisfy a first set of conditions or a second set of conditions. For example, it may be determined whether the sensor(s) readings exceed a certain threshold, is within a certain range, sensor(s) readings within a certain proximity showing a spike in measured values within a certain amount of time of one another, etc.

If it is determined that the first set of conditions are satisfied, steps 1112, 1114, 1122, and 1124 may be performed. If it is determined that the second set of conditions are satisfied, e.g., sensor(s) readings went from elevated reading to normal, sensor(s) readings that were reading above a certain threshold value decreased by a certain percentage within a certain amount of time of one another, etc., steps 1112 and 1114 may be performed. Furthermore, in response to the second set of conditions being satisfied, at step 1126 the time stamping of the captured visual data may be terminated and at step 1128 the storage of the captured visual data may be stopped and terminated.

Figure 12:
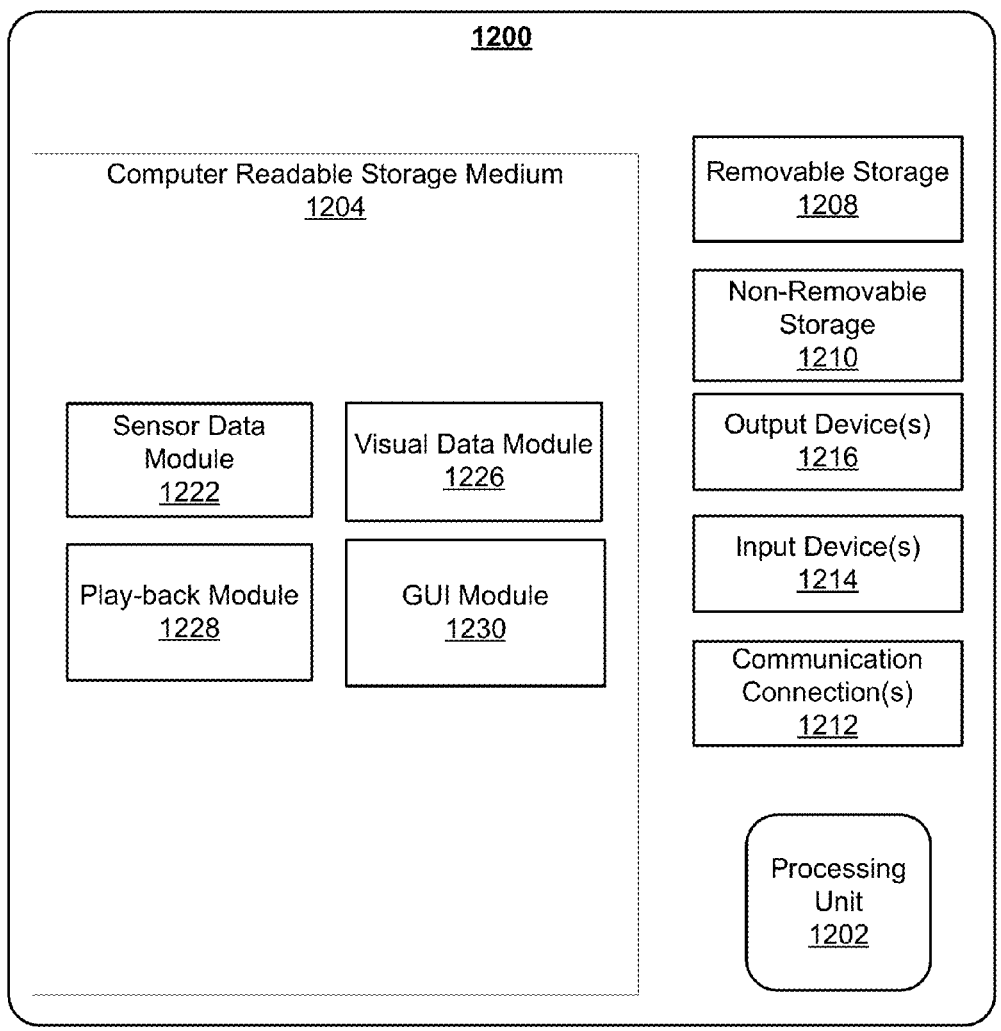
FIG. 12 shows a computer system in accordance with some embodiments.

Referring now to FIG. 12, a block diagram of a computer system in accordance with some embodiments is shown. With reference to FIG. 12, an exemplary system module for implementing embodiments includes a general purpose computing system environment, such as computing system environment 1200. Computing system environment 1200 may include, but is not limited to, servers, switches, routers, desktop computers, laptops, tablets, mobile devices, and smartphones. In its most basic configuration, computing system environment 1200 typically includes at least one processing unit 1202 and computer readable storage medium 1204. Depending on the exact configuration and type of computing system environment, computer readable storage medium 1204 may be volatile (such as RAM), non-volatile (such as ROM, flash memory, etc.) or some combination of the two. Portions of computer readable storage medium 1204 when executed facilitate the rendition of measured values and the captured visual data (e.g., process 1100 and as described in FIGS. 1A-11B).

Additionally, in various embodiments, computing system environment 1200 may also have other features/functionality. For example, computing system environment 1200 may also include additional storage (removable and/or non-removable) including, but not limited to, magnetic or optical disks or tape. Such additional storage is illustrated by removable storage 1208 and non-removable storage 1210. Computer storage media includes volatile and nonvolatile, removable and non-removable media implemented in any method or technology for storage of information such as computer readable instructions, data structures, program modules or other data. Computer readable medium 1204, removable storage 1208 and nonremovable storage 1210 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1200. Any such computer storage media may be part of computing system environment 1200.

In some embodiments, computing system environment 1200 may also contain communications connection(s) 1212 that allow it to communicate with other devices. Communications connection(s) 1212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 1212 may allow computing system environment 1200 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1212 connect to may run a plurality of network protocols including, but not limited to, transmission control protocol (TCP), user datagram protocol (UDP), IP, real-time transport protocol (RTP), real-time transport control protocol (RTCP), file transfer protocol (FTP), and hypertext transfer protocol (HTTP).

In further embodiments, computing system environment 1200 may also have input device(s) 1214 such as keyboard, mouse, a terminal or terminal emulator (either connected or remotely accessible via telnet, SSH, http, SSL, etc.), pen, voice input device, touch input device, remote control, etc. Output device(s) 1216 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, computer readable storage medium 1204 includes a sensor data module 1222, a visual data module 1226, a playback module 1228, and a GUI module 1230. The sensor data module 1222 is operable to receive the measured information from sensors, process them, e.g., determine whether a condition is satisfied, time stamp, etc. The visual data module 1228 may be used to receive captured visual data from the visual capturing devices and to store them (automatically or in response to a certain condition being satisfied). The playback module 1226 operates to enable the user to manipulate the rendition of measured value(s) and/or the captured visual data via the GUI module 1230, and as described in FIGS. 1-11B.

It is appreciated that implementations according to embodiments are described with respect to a computer system are merely exemplary and not intended to limit the scope. For example, embodiments may be implemented on devices such as switches and routers, which may contain application specific integrated circuits (ASICs), field programmable gate arrays (FPGAs), etc. It is appreciated that these devices may include a computer readable medium for storing instructions for implementing methods according to flow diagram 1100.

Figure 13:
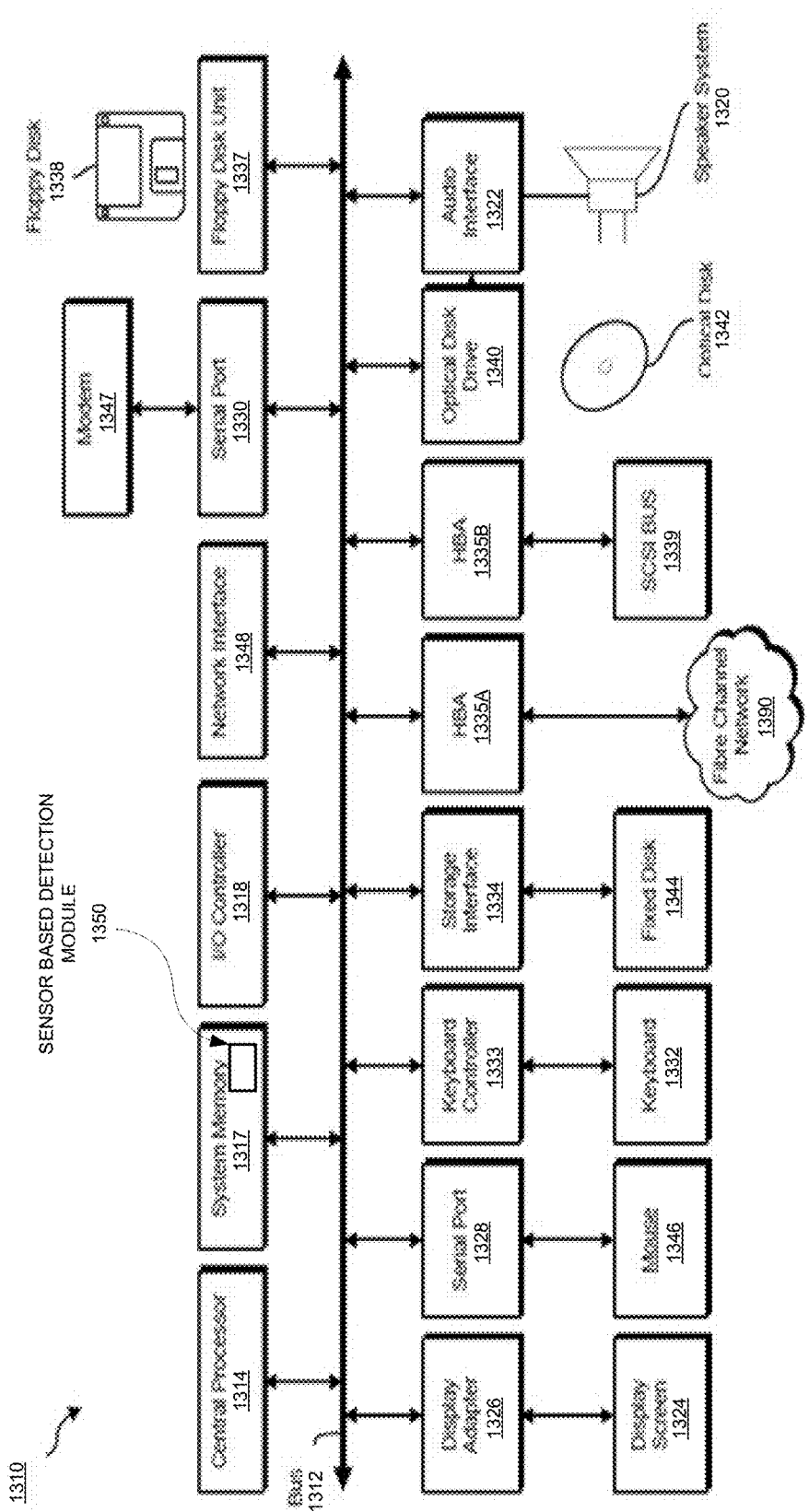
FIG. 13 shows a block diagram of another computer system in accordance with some embodiments.

Referring now to FIG. 13, a block diagram of a computer system in accordance with some embodiments is shown. FIG. 13 depicts a block diagram of a computer system 1310 suitable for implementing the present disclosure. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312). It is appreciated that the network interface 1348 may include one or more Ethernet ports, wireless local area network (WLAN) interfaces, etc., but are not limited thereto. System memory 1317 includes a sensor based detection module 1350 which is operable to manage sensor(s) and visual capturing device (s), and to manage the content thereof and to render relevant information on a GUI with a playback device for user manipulation thereof. According to one embodiment, the sensor based detection module 1350 may include other modules for carrying out various tasks. For example, the sensor based detection module 1350 may include the sensor data module 1222, a visual data module 1226, a playback module 1228, and a GUI module 1230, as discussed with respect to FIG. 12 above. It is appreciated that the sensor based detection module 1350 may be located anywhere in the system and is not limited to the system memory 1317. As such, residing of the sensor based detection module 1350 within the system memory 1317 is merely exemplary and not intended to limit the scope. For example, parts of the sensor based detection module 1350 may reside within the central processor 1314 and/or the network interface 1348 but are not limited thereto.

Bus 1312 allows data communication between central processor 1314 and system memory 1317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1310 are generally stored on and accessed via a computer readable medium, such as a hard disk drive (e.g., fixed disk 1344), an optical drive (e.g., optical drive 1340), a floppy disk unit 1337, or other storage medium. Additionally, applications can be in the form of electronic signals modulated in accordance with the application and data communication technology when accessed via network modem 1347 or interface 1348.

Storage interface 1334, as with the other storage interfaces of computer system 1310, can connect to a standard computer readable medium for storage and/or retrieval of information, such as a fixed disk drive 1344. Fixed disk drive 1344 may be a part of computer system 1310 or may be separate and accessed through other interface systems. Network interface 1348 may provide multiple connections to other devices. Furthermore, modem 1347 may provide a direct connection to a remote server via a telephone link or to the Internet via an internet service provider (ISP). Network interface 1348 may provide one or more connection to a data network, which may include any number of networked devices. It is appreciated that the connections via the network interface 1348 may be via a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 13 need not be present to practice the present disclosure. The devices and subsystems can be interconnected in different ways from that shown in FIG. 13. The operation of a computer system such as that shown in FIG. 13 is readily known in the art and is not discussed in detail in this application. Code to implement the present disclosure can be stored in computer-readable storage media such as one or more of system memory 1317, fixed disk 1344, optical disk 1342, or floppy disk 1338. The operating system provided on computer system 1310 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the claimed embodiments to the precise forms disclosed. Many modifications and variations are possible in view of the above teachings.

What is claimed is:

1. A system comprising:
   a sensor configured to measure a value associated with an input, wherein the sensor is further configured to time stamp the measured value;
   a visual capturing device configured to capture visual data, wherein the visual capturing device is further configured to time stamp the captured visual data; and
   a controller configured to cause the measured value and the captured visual data to be rendered on a display device simultaneously;
   wherein the controller is further configured to store the measured value with the time stamp and the captured visual data with the time stamp;
   wherein the controller is further configured to display a representation of the sensor on a geographical map, wherein the representation of the sensor on the map is positioned in its geo-positional location on the map based on global positioning system (GPS) coordinates of the sensor stored by the controller;
   wherein the controller is further configured to display a representation of the visual capturing device on the map, wherein the representation of the visual capturing device on the map is positioned in its geo-positional location on the map based on GPS coordinates of the visual capturing device stored by the controller; and
   wherein the controller is further configured to scroll through the stored measured value and captured visual data based on the time stamp on the display of the representation of the sensor and the visual capturing device on the map.

2. The system as described in claim 1, wherein the sensor is selected from a group consisting of thermal sensor, electromagnetic sensor, mechanical sensor, motion sensor, and biological/chemical sensor, and wherein the visual capturing device is associated with the sensor.

3. The system as described in claim 1, wherein the visual capturing device is selected from a group consisting of a camera and a video camera, and wherein the controller is further configured to display the measured value of the sensor and the captured visual data of the visual capturing device simultaneously upon selection by a user of the displayed representation of the sensor on the map.

4. The system as described in claim 1, wherein the controller is further configured to cause the measured value to be time stamped and stored in a storage medium for later retrieval, and wherein the controller is further configured to display a configuration state of the sensor, a last reset of the sensor, a duration of the state of the sensor, a name of the sensor, a sensor type, a closest sensor within proximity of the sensor, and a closest visual capturing device upon selection by a user of the displayed representation of the sensor on the map.

5. The system as described in claim 1, wherein the controller is further configured to determine whether the measured value satisfies a certain condition, wherein the sensor is configured to measure a plurality of values associated with the input, and wherein the visual capturing device is configured to capture a sequence of visual data associated with the plurality of values.

6. The system as described in claim 5, wherein the controller in response to determining that the measured value satisfies the certain condition causes the captured visual data to be time stamped and stored in a storage medium for later retrieval, wherein the sensor and the visual capturing device are within a same physical proximity, and wherein the captured visual data is associated with the measured value, and wherein the certain condition is at least one of: the sensor reading exceeding a threshold and a group of sensor readings exceeding a threshold within a certain period.

7. The system as described in claim 1, wherein the controller is further configured to display the captured visual data associated with the measured value of the sensor based on a user selection of the sensor and an associated timestamp on the map.

8. The system as descried in claim 1, wherein the captured visual data is time stamped and stored in a storage medium for later retrieval responsive to a user selection to timestamp.

9. The system as described in claim 1, wherein the sensor and the visual capturing device are within a same physical proximity, and wherein the captured visual data is associated with the measured value, wherein the same physical proximity is at least one of: within a line of sight, within a same room, and within a same building.

10. The system as described in claim 1, wherein the sensor is configured to measure a plurality of values associated with the input, and wherein the visual capturing device is configured to capture a sequence of visual data associated with the plurality of values, and wherein the controller is configured to cause the plurality of values and the sequence of visual data to be rendered on the display device simultaneously and scroll through in time responsive to user manipulation, and wherein the sequence of visual data is a video feed.

11. The system as described in claim 1, wherein the controller is further configured to display a color coding of the sensor on the map based on the value measured by the sensor, wherein the color coding provides a different color for each of: a calibrating sensor, a normal reading from the sensor, an elevated sensor reading, a potential hazard sensor reading, and a hazard alert sensor reading.

12. A system comprising:
    a plurality of sensors configured to measure values associated with inputs associated therewith, wherein the plurality of sensors are further configured to time stamp the measured values;
    a plurality of visual capturing devices configured to capture visual data associated therewith, wherein a subset of the plurality of sensors is associated with a subset of the plurality of visual capturing devices, wherein the plurality of visual capturing devices are further configured to time stamp the captured visual data; and
    a controller configured to cause measured values associated with the subset of the plurality of sensors that is further associated with captured visual data associated with the subset of the plurality of visual capturing devices to be simultaneously rendered on a display device;
    wherein the controller is further configured to store the measured values with the time stamp and the captured visual data with the time stamp;
    wherein the controller is further configured to display a representation of the plurality of sensors on a geographical map, wherein the locations of the plurality of sensors on the map are based on global positioning system (GPS) coordinates of the plurality of sensors stored by the controller;
    wherein the controller is further configured to display a representation of the plurality of visual capturing devices on the map, wherein the locations of the plurality of visual capturing devices are based on GPS coordinates of the plurality of visual capturing devices stored by the controller; and wherein the controller is further configured to scroll through the stored measured values and captured visual data based on the time stamp on the display of the representation of the plurality of sensors and the plurality of visual capturing devices on the map.

13. The system as described in claim 12, wherein the controller is further configured to display a path traveled by a material on the map based on the measured values of the plurality of sensors and the stored GPS coordinates of the plurality of sensors, and wherein the controller is further configured to display the measured value of the sensor and the captured visual data of the visual capturing device simultaneously upon selection by a user of the displayed representation of the sensor on the map.

14. The system as described in claim 12, wherein the subset of the plurality of sensors is associated with the subset of the plurality of visual capturing devices in response to heuristics.

15. The system as described in claim 14, wherein the heuristics is based on latitude and longitude of the subset of the plurality of sensors and further based on latitude and longitude of the subset of plurality of visual capturing devices, and wherein the heuristics is further based on whether the subset of the plurality of sensors and the subset of the plurality of visual capturing devices are within a same physical boundaries such that the subset of plurality of visual capturing devices is configured to provide visual queues associated with physical proximity of the subset of the plurality of sensors, and wherein the same physical boundaries are at least one of: within a line of sight and within a same room.

16. The system as described in claim 12, wherein the subset of the plurality of sensors associated with the subset of the plurality of visual capturing devices share a similar geo-locational characteristic and are within a certain physical proximity of one another, and wherein the controller is further configured to display a configuration state of the sensor, a last reset of the sensor, a duration of the state of the sensor, a name of the sensor, a sensor type, a closest sensor within proximity of the sensor, and a closest visual capturing device upon selection by a user of the displayed representation of the sensor on the map.

17. The system as described in claim 12, wherein the controller is configured to cause the measured values associated with the subset of the plurality of sensors to be time stamped and stored, and wherein the controller is further configured to cause a subset of the captured visual data associated with the subset of the plurality of visual capturing devices to be time stamped and stored responsive to the measured values associated with the subset of the plurality of sensors satisfying a certain condition, and wherein the certain condition is at least one of: the sensor reading exceeding a threshold and a group of sensor readings exceeding a threshold within a certain period.

18. A method comprising:
receiving a plurality of measured values from a plurality of sensors, wherein the plurality of sensors are configured to time stamp the plurality of measured values;
receiving a plurality of captured visual data from a plurality of visual capturing devices, wherein at least one of the plurality of visual capturing devices is associated with at least one of the sensors of the plurality of sensors, wherein the plurality of captured visual data is associated with the plurality of measured values, and wherein the plurality of visual capturing devices are further configured to time stamp the plurality of captured visual data; and rendering the plurality of measured values and the plurality of captured visual data simultaneously on a graphical user interface;

storing the plurality of measured values with the time stamp and the plurality of captured visual data with the time stamp;

rendering a representation of the plurality of sensors on a geographical map of the GUI, wherein the locations of the plurality of sensors on the map are based on global positioning system (GPS) coordinates of the plurality of sensors;

rendering a representation of the plurality of visual capturing devices on the map of the GUI, wherein the locations of the plurality of visual capturing devices are based on GPS coordinates of the plurality of visual capturing devices; and rendering a scroll through the stored measured values and captured visual data based on the time stamp on the display of the rendered representation of the plurality of sensors and the plurality of visual capturing devices on the map of the GUI.

19. The method as described in claim 18 further comprising:
scrolling in time through the plurality of measured values and the plurality of captured visual data simultaneously on the graphical user interface in response to a user interaction with the graphical user interface; and rendering for each sensor of the plurality of sensors: a configuration state, a last reset, a duration of the state, a name, a sensor type, a closest sensor within proximity, and a closest visual capturing device upon selection by a user of the displayed representation of the sensor on the map.

20. The method as described in claim 18, wherein the sensor and the visual capturing device are within a same physical boundaries such that the visual capturing device is configured to provide visual queues associated with physical proximity of the sensor, and wherein the same physical boundaries are at least one of: within a line of sight, within a same room, and within a same building.

21. The method as described in claim 18 further comprising:
rendering a path traveled by a material on the map based on the measured values from the plurality of sensors and the GPS coordinates of the plurality of sensors; and
rendering the measured values of the plurality of sensors and the captured visual data of the visual capturing devices simultaneously upon selection by a user of the displayed representation of the sensor on the map.

22. The method as described in claim 18, wherein the representation of the plurality of sensors is color coded based on the measured values of each sensor of the plurality of sensors, wherein the color coding provides a different color for each of: a calibrating sensor, a normal reading from the sensor, an elevated sensor reading, a potential hazard sensor reading, and a hazard alert sensor reading.

* * * * *